United States Patent
Muta et al.

(10) Patent No.: US 11,497,005 B2
(45) Date of Patent: Nov. 8, 2022

(54) CONTROL DEVICE AND CONTROL METHOD

(71) Applicant: Panasonic Corporation, Osaka (JP)

(72) Inventors: Ryuji Muta, Kanagawa (JP); Yuta Seki, Kanagawa (JP); Shozo Okasaka, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

(21) Appl. No.: 17/220,517

(22) Filed: Apr. 1, 2021

(65) Prior Publication Data

US 2021/0321390 A1 Oct. 14, 2021

(30) Foreign Application Priority Data

Apr. 10, 2020 (JP) .............................. JP2020-070986

(51) Int. Cl.
*H04W 72/04* (2009.01)
*H04W 88/08* (2009.01)

(52) U.S. Cl.
CPC .... *H04W 72/0413* (2013.01); *H04W 72/0453* (2013.01)

(58) Field of Classification Search
CPC ............................ H04W 88/085; H04W 88/08
See application file for complete search history.

(56) References Cited

U.S. PATENT DOCUMENTS

| | | | |
|---|---|---|---|
| 2018/0337846 A1* | 11/2018 | Lee ........................ | H04L 5/0053 |
| 2019/0297555 A1* | 9/2019 | Hampel ................. | H04L 47/58 |
| 2021/0014737 A1* | 1/2021 | Yang ..................... | H04W 76/11 |

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.
Alba et al., "An adaptive functional split in 5G networks," IEEE, 2019, 8 pages.
Chang et al., "RAN Runtime Slicing System for Flexible and Dynamic Service Execution Environment," IEEE Access, vol. 6, 2018, 25 pages.

* cited by examiner

*Primary Examiner* — Kevin Kim
(74) *Attorney, Agent, or Firm* — Seed IP Law Group LLP

(57) ABSTRACT

A control device includes reception circuitry which, in operation, receives control information regarding resources to be allocated to a plurality of distributed units, and control circuitry which, in operation, determines, based on the control information, a distributed unit to which a received signal of uplink is to be transferred among the plurality of distributed units.

9 Claims, 21 Drawing Sheets

| DU ID | 1 | 2 |
|---|---|---|
| startRB | 1 | 1 |
| NumRB | 25 | 25 |
| subframe | 0, 2, 4, 6, 8 | 1, 3, 5, 7, 9 |

CONTROL DEVICE AND CONTROL METHOD

BACKGROUND

1. Technical Field

The present disclosure relates to a control device and a control method.

2. Background Art

For radio systems, an architecture called centralized-radio access network (C-RAN) is being considered. In the C-RAN, a base station function is divided and arranged in a central station (central unit (CU)) and a distributed station (distributed unit (DU)). For example, in the 3rd Generation Partnership Project (3GPP), which is an international standardization organization, functional arrangement between the CU and the DU is considered to meet various service requirements such as low latency and high throughput in the 5th generation mobile communication systems (5G).

Further, in an open-radio access network (O-RAN), a radio station (radio unit (RU)) is defined in addition to the CU and the DU, and standardization of specifications is in progress with respect to a configuration in which the DU and the RU are connected by a communication interface called a fronthaul.

SUMMARY

In a configuration in which the function of the base station is separated, there is room for consideration regarding transmission efficiency of uplink (UL) signals in the fronthaul.

One non-limiting and exemplary embodiment facilitates providing a control device and a control method capable of improving the transmission efficiency of UL signals in the fronthaul.

In one general aspect, the techniques disclosed here feature a control device including reception circuitry which, in operation, receives control information regarding resources to be allocated to a plurality of distributed units, and control circuitry which, in operation, determines, based on the control information, a distributed unit to which a received signal of uplink is to be transferred among the plurality of distributed units.

It should be noted that general or specific embodiments may be implemented as a system, a method, an integrated circuit, a computer program, a storage medium, or any selective combination thereof.

According to an exemplary embodiment of the present disclosure, the transmission efficiency of UL signals in the fronthaul can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF PREFERRED EMBODIMENTS

Hereinafter, exemplary embodiments of the present disclosure will be described in detail with reference to the drawings.

<Knowledge that LED to Present Disclosure>

Figure 1:
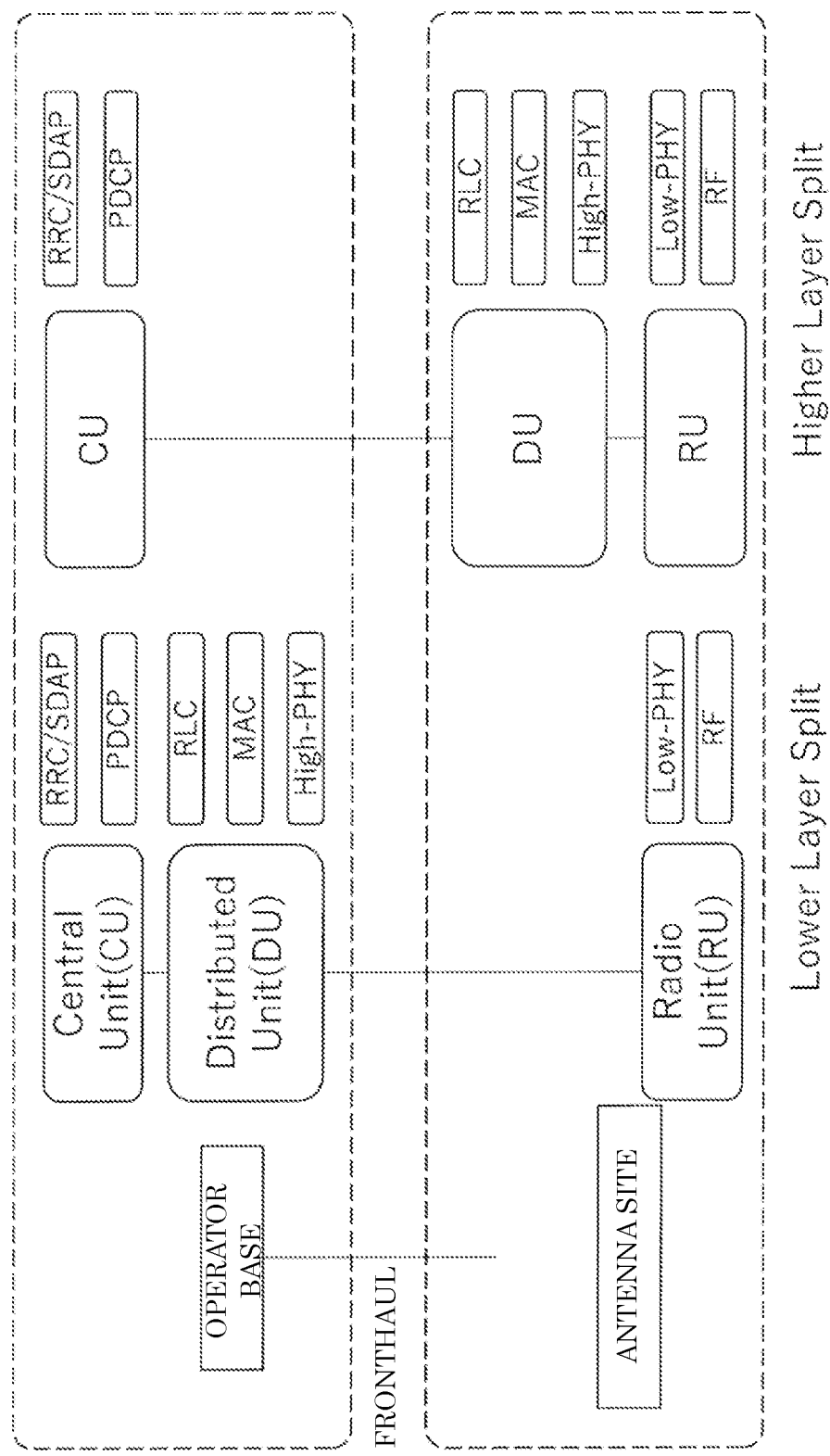
FIG. 1 is a diagram illustrating an arrangement example of base station functions.

FIG. 1 is a diagram illustrating an arrangement example of base station functions. FIG. 1 illustrates an example in which a plurality of base station functions is separately arranged at an antenna site and an operator base.

For example, in "Lower Layer Split", an RU is arranged on an antenna site side, and a DU and a CU are arranged on an operator base side. In "Higher Layer Split", for example, an RU and a DU are arranged on the antenna site side, and a CU is arranged in the operator base.

In the example illustrated in FIG. 1, one DU is arranged for one RU. On the other hand, in order to meet various service demands, an architecture in which a plurality of DUs with different arrangements of base station functions is connected to one RU is considered. For example, it may be expected that DUs each corresponding to one of a plurality of services sharing a radio resource connects to one RU that receives signals using the radio resource. The plurality of services sharing radio resources may include, for example, massive machine type communication (mMTC), enhanced mobile broadband (eMBB), and ultra-reliable and low latency communications (URLLC).

In an architecture in which a plurality of DUs with different base station function arrangements is connected to one RU, when a UL signal received by the RU is output to a plurality of DUs, it is possible that transmission efficiency is decreased by excessive (unnecessary) use of the band of the fronthaul.

In a non-limiting example of the present disclosure, a configuration for improving the transmission efficiency of the UL signal in the fronthaul by outputting the UL signal to an appropriate DU will be described.

First Exemplary Embodiment

Figure 2:
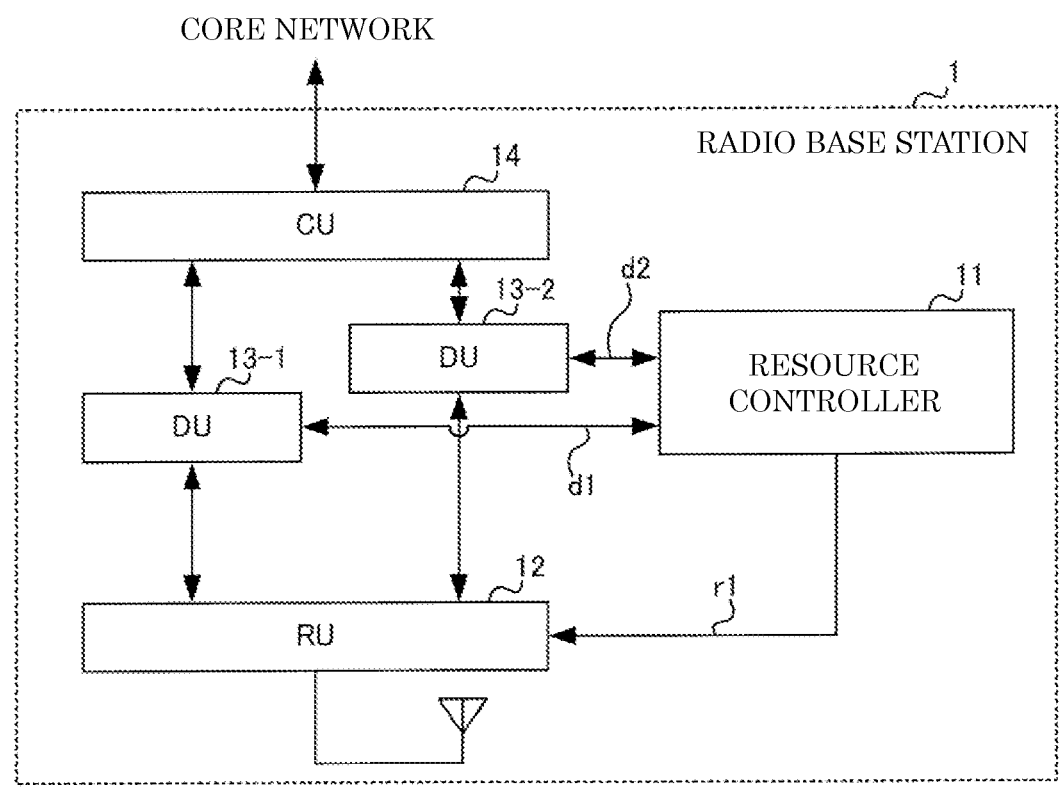
FIG. 2 is a block diagram illustrating a configuration example of a radio base station according to a first exemplary embodiment.

FIG. 2 is a block diagram illustrating a configuration example of radio base station 1 according to a first exemplary embodiment. Radio base station 1 includes, for example, resource controller 11, RU 12, DU 13-1 and DU 13-2, and CU 14. Hereinafter, when it is not necessary to distinguish DU 13-1 and DU 13-2, they may be described as DU 13. Further, DU 13-1 and DU 13-2 may be described as "DU #1" and "DU #2", respectively.

Connection between CU 14 and DU 13-1, connection between CU 14 and DU 13-2, connection between resource controller 11 and DU 13-1, connection between resource controller 11 and DU 13-2, connection between RU 12 and DU 13-1, connection between RU 12 and DU 13-2, and connection between RU 12 and resource controller 11 are made by a communication interface. The communication interface may be either an electrical interface or an optical interface.

Resource controller 11 is a device equipped with at least one of, for example, a central processing unit (CPU), a digital signal processor (DSP), and a field programmable gate array (FPGA). Resource controller 11 operates, for example, on at least one of the CPU, the DSP, and the FPGA mounted. Resource controller 11 allocates a radio resource to each DU. The radio resource allocated by resource controller 11 is, for example, one of a resource defined in a time domain (time resource), a resource defined in a frequency domain (frequency resource), and a combination of the time resource and the frequency resource.

RU 12 is, for example, a device equipped with at least one of a CPU, a DSP, and an FPGA. RU 12 operates, for example, on at least one of the CPU, the DSP, and the FPGA mounted. RU 12 includes a radio frequency (RF) part and a part of a physical layer processing (PHY) function (Low-PHY).

DU 13 is, for example, a device equipped with at least one of a CPU, a DSP, and an FPGA. DU 13 operates, for example, on at least one of the CPU, the DSP, and the FPGA mounted. Operations executed by DU 13 include a part of the PHY function (High-PHY) not included in RU 12. Further, the operations executed by DU 13 include a medium access control (MAC) function and a radio link control (RLC) function.

CU 14 is, for example, a device equipped with at least one of a CPU, a DSP, and an FPGA. CU 14 operates on, for example, at least one of the CPU, the DSP, and the FPGA mounted. Operations executed by CU 14 include a radio resource control (RRC) function, a service data adaptation protocol (SDAP) function, and a packet data convergence protocol (PDCP) function.

Hereinafter, each of resource controller 11, RU 12, DU 13, and CU 14 will be described. Note that in the following example, a configuration in which radio base station 1 receives an uplink (UL) signal from a terminal (for example, user equipment, UE) is illustrated.

Figure 3:
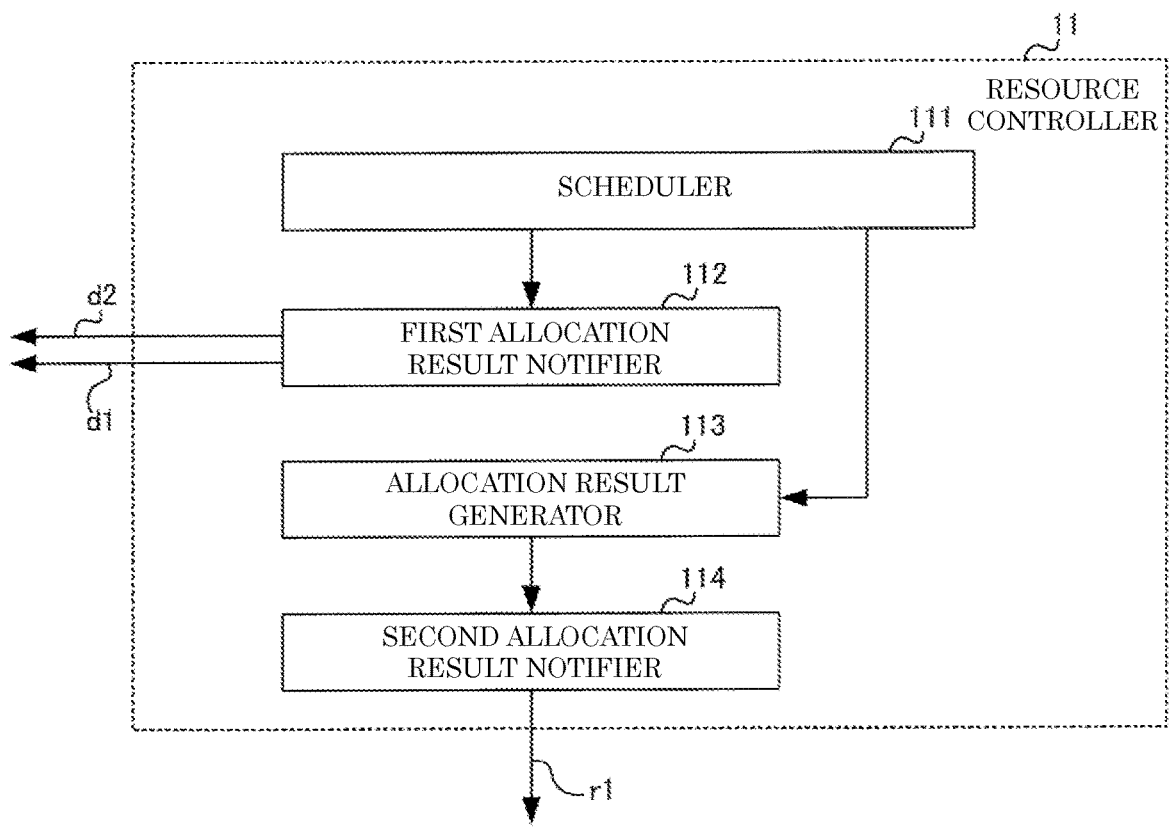
FIG. 3 is a block diagram illustrating a configuration example of a resource controller according to the first exemplary embodiment.

FIG. 3 is a block diagram illustrating a configuration example of resource controller 11 according to the first exemplary embodiment. Resource controller 11 includes scheduler 111, first allocation result notifier 112, allocation result generator 113, and second allocation result notifier 114.

Scheduler 111 schedules allocation of radio resources available to the system to each DU 13. The algorithm used in the scheduling function may be round robin, proportional fairness, or any other algorithm. The scheduling determines radio resource allocation for every DU 13. Note that this radio resource allocation may be understood as controlling the distribution (or ratio) of radio resources between DUs.

First allocation result notifier 112 connects to DU 13-1 through communication interface d1 and connects to DU 13-2 through communication interface d2. First allocation result notifier 112 acquires a result of the radio resource allocation determined by scheduler 111, notifies DU 13-1 of the result of the radio resource allocation through communication interface d1, and notifies DU 13-2 of the result of the radio resource allocation through communication interface d2.

For example, when each DU (for example, function allocation) corresponds to a different service (for example, a different slice), the radio resource allocation between DUs may be changed adaptively depending on at least one of a number of terminals using the service, traffic, and a service type. Accordingly, in scheduler 111, the radio resource allocation may be updated periodically or irregularly for every DU. For example, a frequency of the update may be about several hundred ms. Also in this case, similarly, after determining the radio resource allocation, first allocation result notifier 112 notifies, for example, each DU of the updated radio resource allocation.

Further, for example, if the DU is implemented by slices and a number of slices changes adaptively, the radio resource allocation between DUs may be changed by a number of DUs (number of slices).

Information that each DU is notified of may include at least information regarding available frequency bands in the DU and available time information with respect to the radio resource. For example, information that DU 13-1 is notified of may include at least information regarding available frequency bands in DU 13-1 and time information, and information that DU 13-2 is notified of may include at least information regarding available frequency bands in DU 13-2 and time information.

Allocation result generator 113 generates information that RU 12 is to be notified of. Allocation result generator 113 acquires a result of the radio resource allocation determined by scheduler 111 and generates allocation result information. The allocation result information may include an identifier of each DU, information regarding the frequency band available for every DU, and available time information. Note that an example of the allocation result information will be described later.

Second allocation result notifier 114 connects to RU 12 through communication interface r1. Second allocation result notifier 114 notifies RU 12 of the allocation result information generated by allocation result generator 113. The allocation result information is an example of control information and indicates which DU uses which radio resource.

In other words, resource controller 11 (which may be referred to as, for example, a "control device") includes allocation result generator 113 (which may be referred to as, for example, a "control circuit") that determines control information (for example, the allocation result information) regarding resources to be allocated to a plurality of DUs 13. Further, resource controller 11 includes second allocation result notifier 114 (which may be referred to as, for example, "transmission circuit") that transmits the control information to a device (for example, RU) that determines a DU to which a received signal of uplink is to be transferred among the plurality of DUs.

Note that the information that DU 13 is notified of does not have to include an ID for identifying a DU. On the other hand, the information that RU 12 is notified of may include an ID for identifying a DU.

Figure 4:
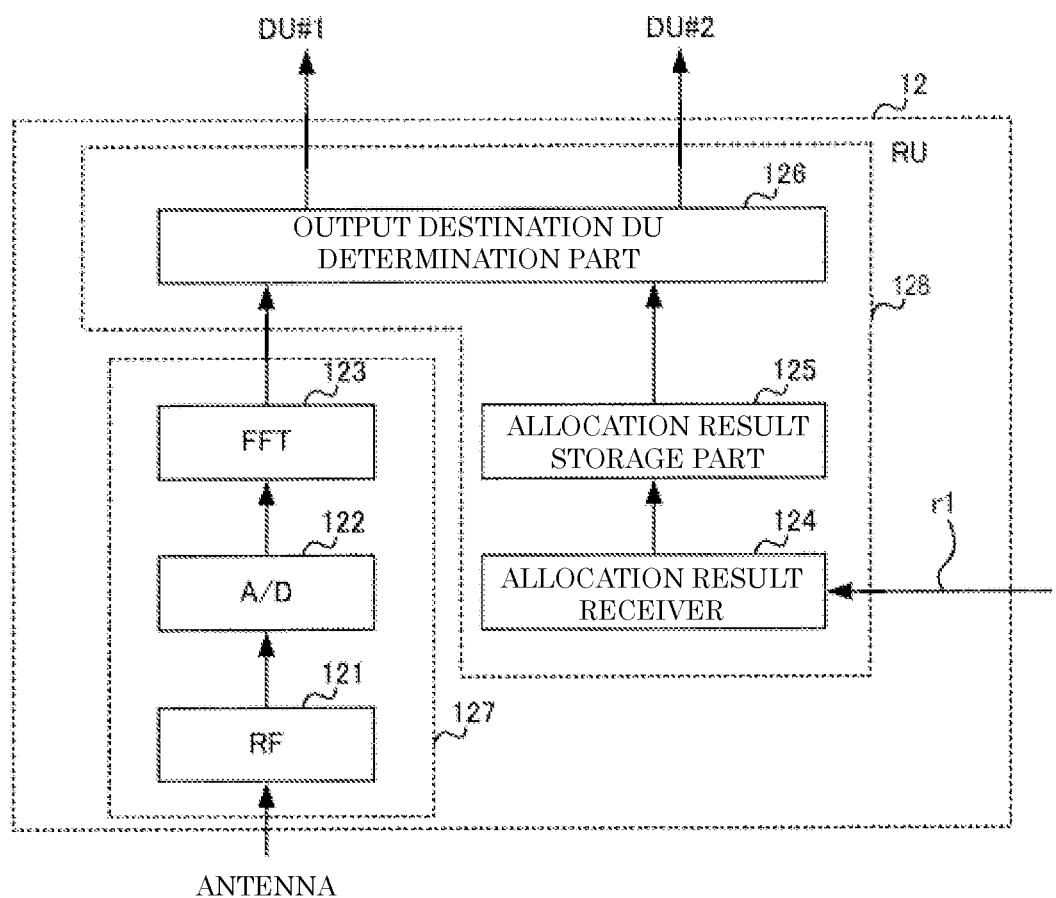
FIG. 4 is a block diagram illustrating a configuration example of an RU according to the first exemplary embodiment.

FIG. 4 is a block diagram illustrating a configuration example of RU 12 according to the first exemplary embodiment. RU 12 includes RF part 121, analog/digital (A/D) part 122, fast Fourier transform (FFT) part 123, allocation result receiver 124, allocation result storage part 125, and output destination DU determination part 126. Note that RF part 121, A/D part 122, and FFT part 123 may be collectively referred to as Low-PHY processor 127. Further, allocation result receiver 124, allocation result storage part 125, and output destination DU determination part 126 may be collectively referred to as control device 128.

RF part 121 performs amplification processing and down-conversion processing on the UL signal from a terminal that is received via an antenna. RF part 121 outputs the processed UL signal to A/D part 122.

A/D part 122 performs analog-to-digital conversion (A/D conversion) on the UL signal output from RF part 121. A/D part 122 outputs the UL signal subjected to the A/D conversion process to FFT part 123.

FFT part 123 performs an FFT process on the UL signal output from A/D part 122. FFT part 123 outputs the UL signal subjected to the FFT process to output destination DU determination part 126.

Allocation result receiver 124 connects to resource controller 11 through communication interface r1. Allocation result receiver 124 receives the allocation result information from resource controller 11 through communication interface r1. Allocation result receiver 124 stores the allocation result information in allocation result storage part 125.

Output destination DU determination part 126 determines DU 13 as an output destination of the UL signal output from FFT part 123 based on the allocation result information stored in allocation result storage part 125. Then, output destination DU determination part 126 outputs the UL signal to DU 13 (DU 13-1 or DU 13-2) based on a determination result. Note that the "output destination" may be replaced with other names such as "transmission destination", "destination", and "transfer destination". Further, an example of determination by output destination DU determination part 126 will be described later.

In other words, RU 12 includes allocation result receiver 124 (which may be referred to as, for example, a "reception circuit") that receives control information (for example, the allocation result information) regarding resources to be allocated to the plurality of DUs 13. Further, RU 12 includes output destination DU determination part 126 (which may be referred to as, for example, a "control circuit") that determines DU 13 that transfers a received signal of uplink among the plurality of DUs 13 based on the control information.

Figure 5:
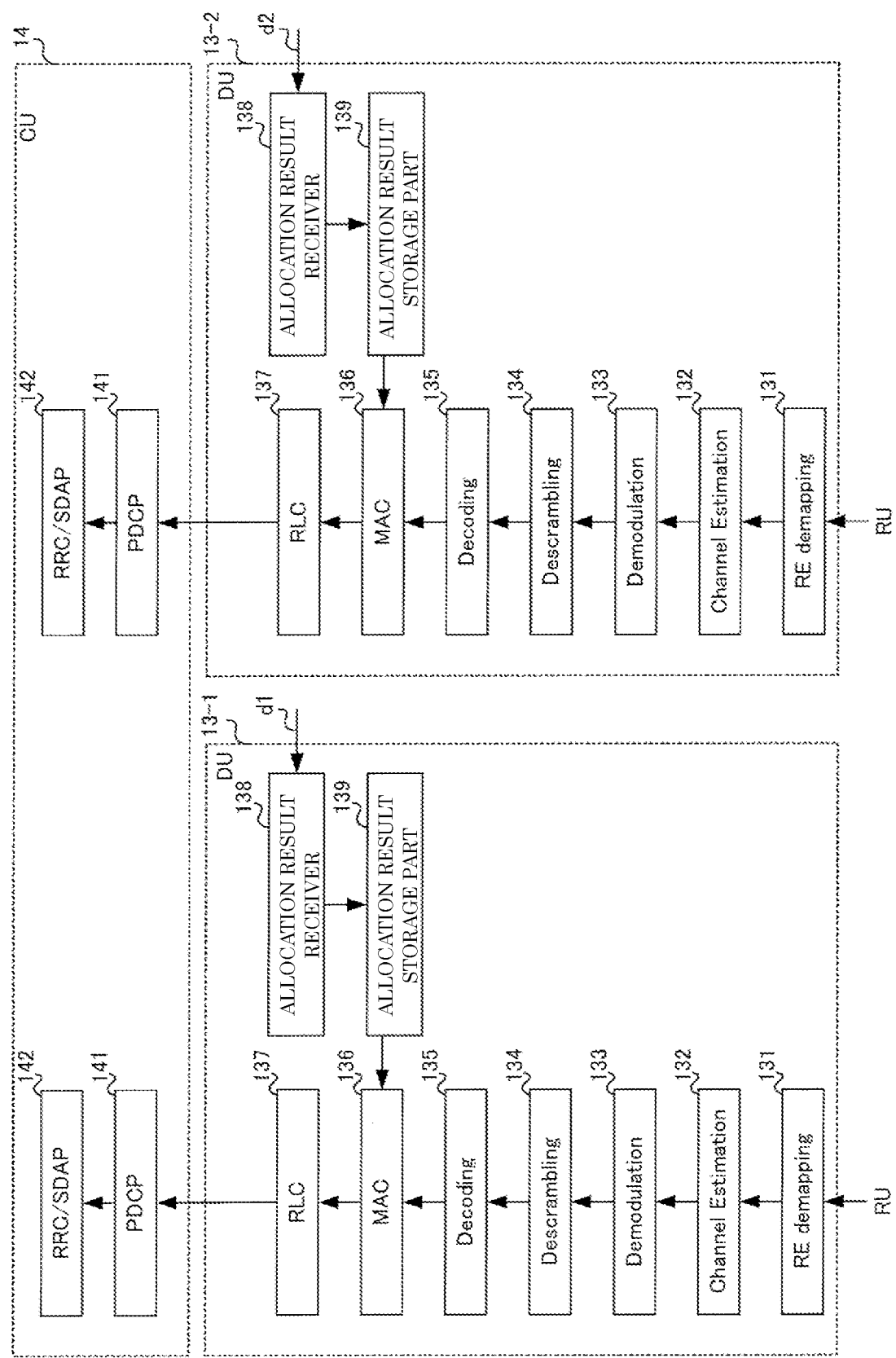
FIG. 5 is a block diagram illustrating a configuration example of a DU and a CU according to the first exemplary embodiment.

FIG. 5 is a block diagram illustrating a configuration example of DU 13 and CU 14 according to the first exemplary embodiment. Each of DUs 13 includes, for example, RE demapping part 131, channel estimator 132, demodulator 133, descrambler 134, decoder 135, MAC part 136, RLC part 137, allocation result receiver 138, and allocation result storage part 139.

RE demapping part 131 performs a demapping process on the UL signal received from RU 12 with respect to signals mapped by the terminal to a predetermined resource element (RE). For example, the demapping process on the UL signal extracts a reference signal (for example, demodulation reference signal (DMRS)) and a data signal.

Channel estimator 132 performs channel estimation using the reference signal included in the UL signal.

Demodulator 133 performs a demodulation process on the data signal included in the UL signal. For example, a demodulation process may be performed according to a modulation method used to modulate the data signal (for example, quadrature phase shift keying (QPSK), 16quadrature amplitude modulation (QAM), 64QAM, 256QAM, and the like).

Descrambler 134 performs a descrambling process on a data signal that has been subjected to the demodulation process.

Decoder 135 performs a decoding process on the data signal that has been subjected to the descrambling process. The signal that has been subjected to the decoding process and is output from decoder 135 has, for example, a format of a transport block.

MAC part 136 generates a parameter (hereinafter, may be referred to as a "reception parameter") used for receiving a signal transmitted from the terminal based on the allocation result. The reception parameter may include information such as a frequency band and time information related to a reception process, for example. The reception parameter may include a reception parameter described in the ORAN standard (ORAN-WG4.CUS.0-v02.00, P60).

MAC part 136 divides a transport block based on the reception parameter and information (for example, packet information) described in a header included in the transport block acquired from decoder 135, and outputs a block after being divided to RLC part 137. Note that the block of a signal output to RLC part 137 may be referred to as a MAC service data unit (SDU).

RLC part 137 performs packet division and reconfiguration based on the information described in the header included in the MAC SDU acquired from MAC part 136. The block of a signal after performing the packet division and reconfiguration may be referred to as an RLC SDU. RLC part 137 outputs the RLC SDU to CU 14.

Allocation result receiver 138 connects to resource controller 11 through communication interface d1. Allocation result receiver 138 receives an allocation result from resource controller 11 through communication interface d1. Allocation result receiver 138 stores the allocation result in allocation result storage part 139.

CU 14 receives a signal (for example, a block of a signal in an RLC SDU format) from each of DU 13-1 and DU 13-2. CU 14 includes PDCP part 141 and RRC/SDAP part 142 connected to DU 13-1, and PDCP part 141 and RRC/SDAP part 142 connected to DU 13-2.

PDCP part 141 decrypts encrypted data and/or decompresses compressed data, and outputs a PDCP SDU to RRC/SDAP part 142.

Based on information described in the data (PDCP SDU) acquired from PDCP part 141, RRC/SDAP part 142 performs, for example, setting change between a radio base station and a connected terminal, a handover process, and data transfer to a core network according to priority control and the like are performed.

Next, examples of the allocation result information and determination of the DU as the output destination based on the allocation result information will be described.

Figures 6A, 6B:
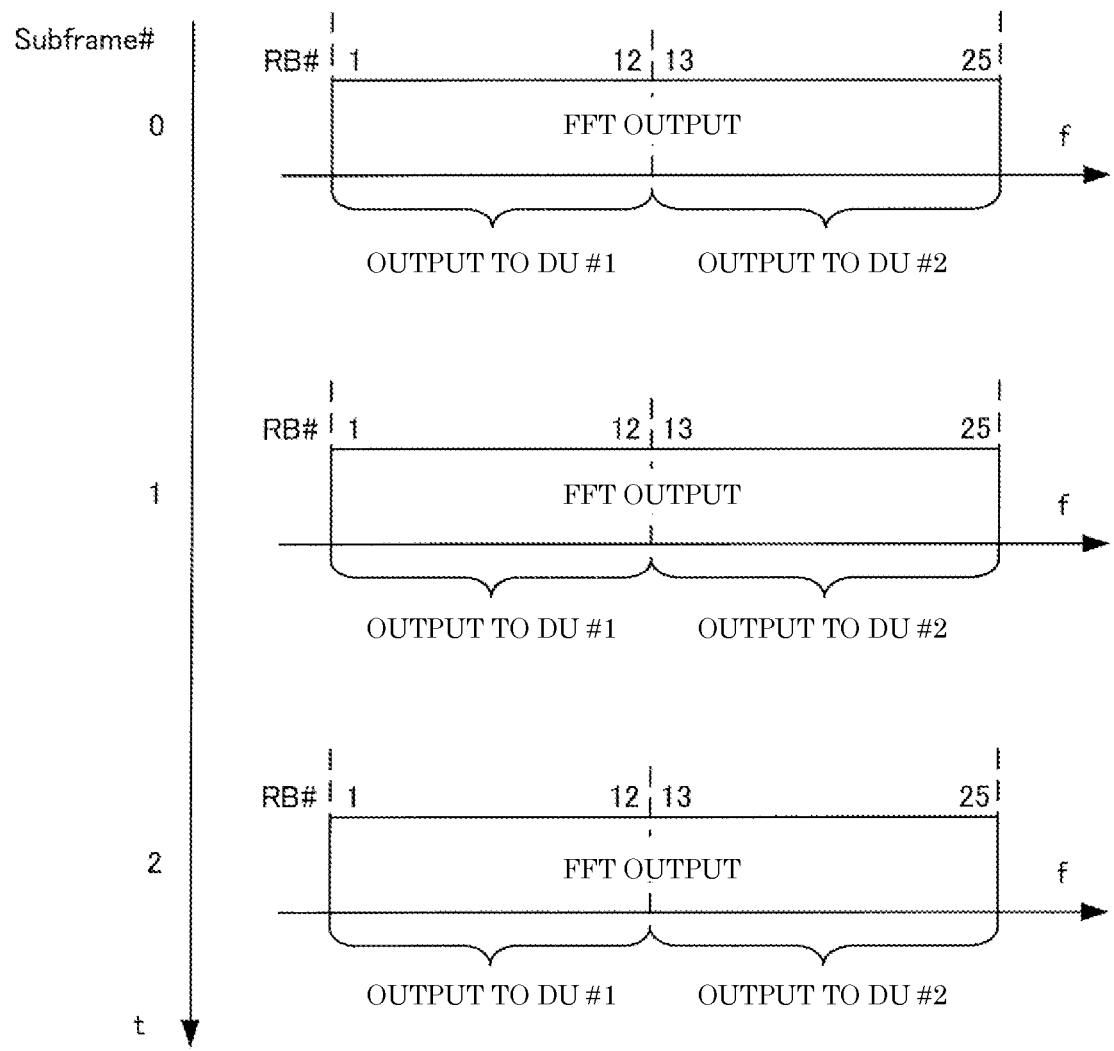
FIG. 6A is a diagram illustrating a first example of allocation result information.
FIG. 6B is a diagram illustrating an example of determining a DU as an output destination based on the first example of the allocation result information illustrated in FIG. 6A.

FIG. 6A is a diagram illustrating a first example of the allocation result information. FIG. 6B is a diagram illustrating an example of determining an output destination DU based on the first example of the allocation result information illustrated in FIG. 6A.

The allocation result information illustrated in FIG. 6A is notified from, for example, resource controller 11 to RU 12. The allocation result information illustrated in FIG. 6A includes an identifier (ID) (DU ID) for identifying DU 13, a start index of a resource block (RB) available in each DU 13, a number of available RBs, and information regarding available subframes.

For example, RU 12 may link the DU ID and DU 13 in the allocation result information by storing the association between the DU ID and destination information (for example, IP address) of the DU in advance. Alternatively, the allocation result information generated by resource controller 11 may include destination information of the corresponding DU together with the DU ID. Note that although FIG. 6A illustrates an example in which the DU ID is a number set for every DU, the DU ID may be an Internet Protocol (IP) address.

For example, the allocation result information illustrated in FIG. 6A indicates that an RB corresponding to indexes 1 to 12 among allocatable RBs is allocated to DU 13 (DU #1) whose DU ID corresponds to "1". Further, the allocation result information illustrated in FIG. 6A indicates that an RB corresponding to indexes 13 to 25 among the allocatable RBs is allocated to DU 13 (DU #2) whose DU ID corresponds to "2". Furthermore, the allocation result information illustrated in FIG. 6A indicates that all subframes are allocated to DU #1 and DU #2, that is, reception is possible in all the subframes.

Output destination DU determination part 126 determines the output destination DU based on the allocation result information, and distributes a signal to the determined output destination DU and outputs the signal.

FIG. 6B illustrates an example of output to the output destination DU by output destination DU determination part 126.

For example, output destination DU determination part 126 extracts (cuts out) a signal in the frequency band corresponding to the indexes 1 to 12 and outputs the signal to DU #1, and extracts (cut out) a signal in the frequency band corresponding to the indexes 13 to 25 and outputs the signal to DU #2 in each of the subframes.

Figures 7A, 7B:
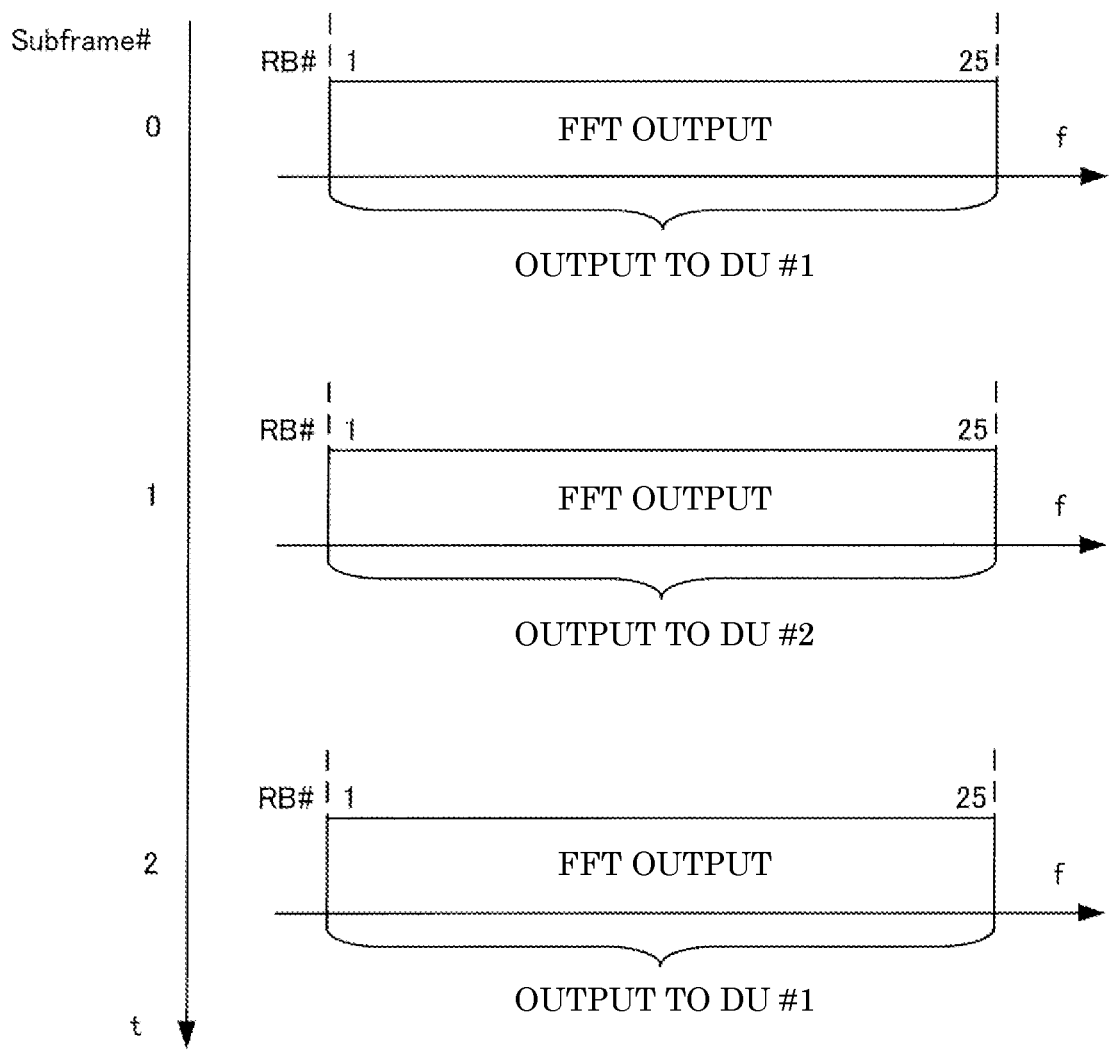
FIG. 7A is a diagram illustrating a second example of the allocation result information.
FIG. 7B is a diagram illustrating an example of determining the DU as the output destination based on the second example of the allocation result information illustrated in FIG. 7A.

FIG. 7A is a diagram illustrating a second example of the allocation result information. FIG. 7B is a diagram illustrating an example of determining the DU as the output destination based on the second example of the allocation result information illustrated in FIG. 7A.

The allocation result information illustrated in FIG. 7A includes a DU ID of DU 13, a start index of a resource block (RB) available in each DU 13, a number of available RBs, and information regarding available subframes, as in the example of FIG. 6A.

For example, the allocation result information illustrated in FIG. 7A indicates that subframes (even subframes) corresponding to indexes 0, 2, 4, 6, 8 out of 10 subframes corresponding to indexes 0 to 9 are allocated to DU 13 (DU #1) whose DU ID corresponds to "1". Further, the allocation result information illustrated in FIG. 7A indicates that subframes (odd subframes) corresponding to indexes 1, 3, 5, 7, 9 out of 10 subframes corresponding to indexes 0 to 9 are allocated to DU 13 (DU #2) whose DU ID corresponds to "2". Furthermore, the allocation result information illustrated in FIG. 7A indicates that frequency bands corresponding to indexes 1 to 25 are allocated to DU #1 and DU #2 among the RBs that can be allocated.

Output destination DU determination part 126 determines the DU as the output destination based on the allocation result information, and outputs a signal to the determined output destination DU.

FIG. 7B illustrates an example of output to an output destination DU by output destination DU determination part 126.

Output destination DU determination part 126, for example, extracts (cuts out) signals of the subframes corresponding to the indexes 0 and 2 and outputs the signals to DU #1, and extracts (cuts out) a signal of the subframe corresponding to the index 1 and outputs the signal to DU #2. Note that each of the signals output from output destination DU determination part 126 is a signal in the frequency band of the indexes 1 to 25.

Note that FIGS. 6B and 7B illustrate an example in which an output result (FFT output) from FFT part 123 is output to each DU 13, but the present disclosure is not limited to this. For example, the UL signal in the time domain may be output to each DU based on the allocation result information.

Figure 8:
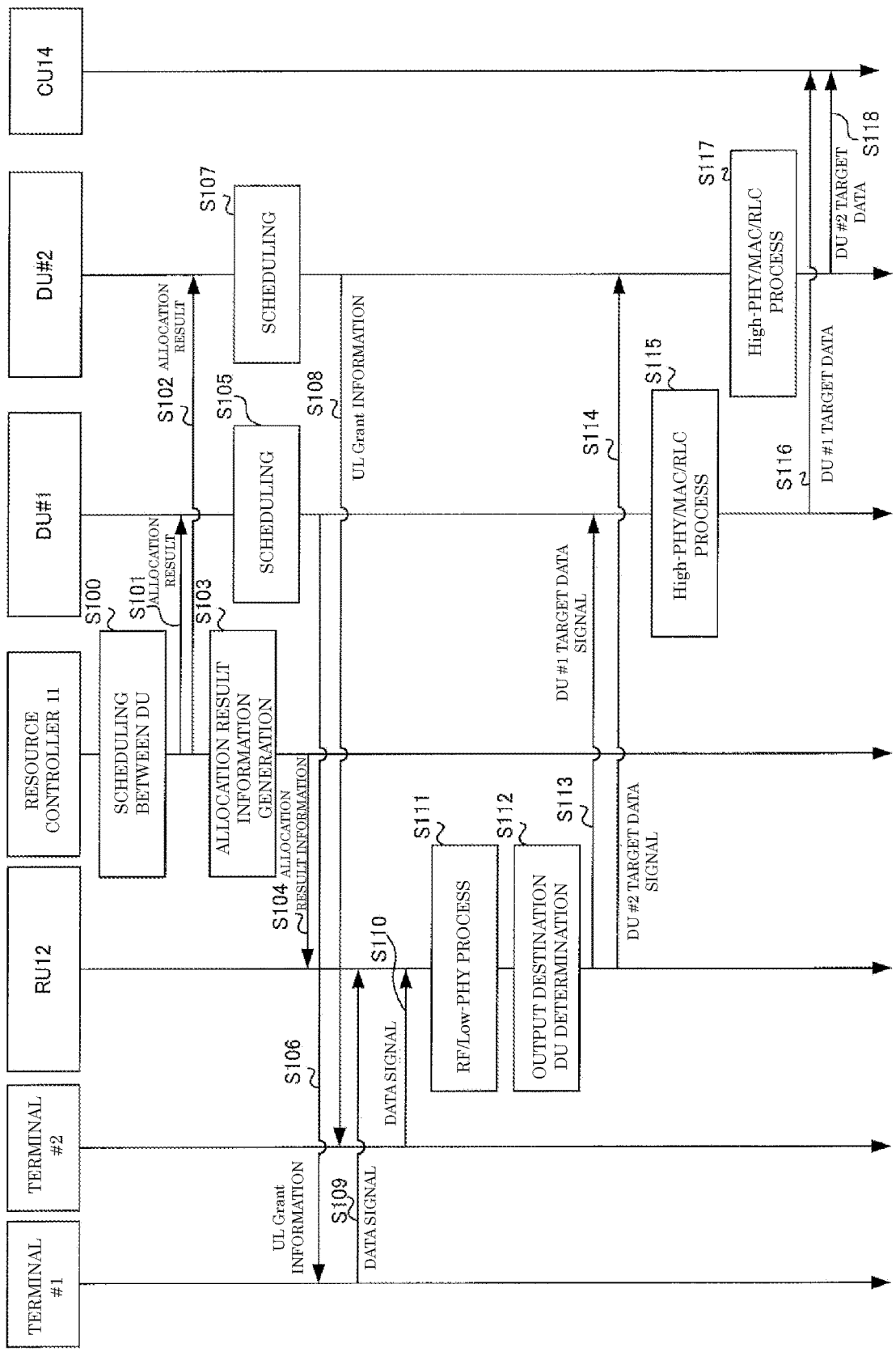
FIG. 8 is a sequence diagram of the radio base station and a terminal according to the first exemplary embodiment.

FIG. 8 is a sequence diagram of radio base station 1 and the terminal according to the first exemplary embodiment.

FIG. 8 illustrates a procedure of processing and information transmission in terminal #1, terminal #2, RU 12, resource controller 11, DU #1, DU #2, and CU 14.

For example, resource controller 11 executes allocation of radio resources (in other words, scheduling) to two DUs #1 and #2 (S100). Resource controller 11 notifies DU #1 of a scheduling result (result of radio resource allocation) (S101). Further, resource controller 11 notifies DU #2 of the scheduling result (result of radio resource allocation) (S102). Furthermore, resource controller 11 generates allocation result information (S103). Then, resource controller 11 notifies RU 12 of the allocation result information (S104). S101, S102, and S104 may be interchanged in the order or may be executed in parallel.

DU #1 receives the result of the radio resource allocation from resource controller 11, and schedules the radio resource for terminal #1, for example, based on the received result (resource allocation information) (S105). For example, DU #1 determines the radio resource to be allocated to terminal #1 among the radio resources to be allocated to DU #1 by resource controller 11.

Then, DU #1 notifies terminal #1 of UL Grant information indicating the radio resource that has been determined to be allocated to terminal #1 (S106). Note that the notification to terminal #1 may be performed via RU 12.

DU #2 schedules radio resources for terminal #2, for example, based on the resource allocation information received from resource controller 11 (S107). For example, DU #2 determines the radio resource to be allocated to terminal #2 among the radio resources to be allocated to DU #2 by resource controller 11.

Then, DU #2 notifies terminal #2 of UL Grant information indicating the radio resource that has been determined to be allocated to terminal #2 (S108). Note that the notification to terminal #2 may be performed via RU 12. Either of the notifications (S106 and S108) to terminal #1 and terminal #2 may be earlier in the order, or the notifications may be executed in parallel.

Terminal #1 transmits a data signal using the radio resource indicated by the UL Grant information received from DU #1 (S109).

Terminal #2 transmits a data signal using the radio resource indicated by the UL Grant information received from DU #2 (S110). The data transmissions (S109 and S110) by terminal #1 and terminal #2 may be interchanged with each other in the order or may be simultaneous.

RU 12 receives the data signal transmitted by terminal #1 in S109 and the data signal transmitted by terminal #2 in S110, and performs an RF process and a low-PHY process on the received data signal (S111).

RU 12 determines the output destination DU of the received data signal of UL based on the allocation result information received from resource controller 11 (S112). Based on a determination result, RU 12 outputs a data signal (target data signal) for DU #1 to DU #1 (S113) and outputs a data signal for DU #2 to DU #2 among the received data signals (S114). For example, in a case where the DUs are assigned by frequency as illustrated in FIGS. 6A, 6B, when the received data signal of UL is received with RB index 13, RU 12 determines DU #2 as the output destination DU based on the allocation result information of FIG. 6A. Note that the process of S113 and the process of S114 may be interchanged with each other in the order or may be performed in parallel (may be simultaneous in time or partially overlapped).

DU #1 performs a High-PHY process, a MAC process, and an RLC process on the data received from RU 12 (S115). Then, DU #1 outputs the data subjected to these processes to CU 14 (S116). DU #2 performs the High-PHY process, the MAC process, and the RLC process on the data received from RU 12 (S117). Then, DU #2 outputs the data subjected to these processes to CU 14 (S118).

Note that although FIG. 7 illustrates the example in which the signal (UL signal) transmitted by the terminal to RU 12 is a data signal, the UL signal may be a control signal including control information.

As described above, in the first exemplary embodiment, resource controller 11 outputs the allocation result information to RU 12, and RU 12 determines DU 13 as the output destination of UL signal based on the allocation result information. Then, RU 12 outputs the UL signal to appropriate DU 13 according to a determination result. With this configuration, unnecessary output (transfer) of the UL signal can be suppressed, so that it is possible to avoid excessive (unnecessary) consumption of the band of the fronthaul, and it is possible to improve transmission efficiency of the UL signal in the fronthaul.

Further, even if the resource allocation between the DUs is changed, resource controller 11 can update the allocation result information and notify RU 12 of the updated allocation result information, and thus efficient data transfer can be achieved by following changes in the resource allocation.

Further, in the first exemplary embodiment, since the function is not added to the DU, the function of the DU can be simplified. For example, even when a device having a function corresponding to the DU is purchased from an external vendor, radio base station 1 including the DU can be achieved. For example, since radio base station 1 includes a plurality of DUs, a low-cost radio base station can be achieved by simplifying the functions of the DUs.

Further, in the example illustrated in FIGS. 6A, 6B of the first exemplary embodiment, the frequency resource is allocated in the resource allocation between the DUs. For example, by allocating the frequency resources between the DUs, it is possible to appropriately allocate resources to the DUs that correspond to services with relatively small data capacity but low latency. Further, the transmission efficiency of the UL signal in the fronthaul can be improved even for such allocation of frequency resources.

Further, in the example illustrated in FIGS. 7A, 7B of the first exemplary embodiment, in the resource allocation between the DUs, allocation by time resource is performed. For example, by allocating time resources between the DUs, it is possible to appropriately allocate resources to the DUs corresponding to time-critical (requiring temporal scheduling) services and bursty transmissions. Further, the transmission efficiency of the UL signal in the fronthaul can be improved even for such allocation of time resources.

Note that in the first exemplary embodiment, although the example in which resource controller 11 includes scheduler 111, first allocation result notifier 112, allocation result generator 113, and second allocation result notifier 114, and is a different element (device) from CU 14 and DU 13 has been described, the present disclosure is not limited to this. For example, resource controller 11 may be included in CU 14 or DU 13. Further, resource controller 11 may be divided into a first resource controller that includes scheduler 111 and first allocation result notifier 112, and a second resource controller that includes allocation result generator 113 and second allocation result notifier 114. The second resource controller may include a receiver that receives information from the first resource controller.

Further, although the example in which the function of each DU 13 is implemented in different hardware for every DU 13 has been described, the function may be executed as different pieces of software in the same hardware, for example, like multiple pieces of software executed on the CPU of the same server. Moreover, although the function of CU 14 is implemented in the same hardware, the function may be executed in different, separate pieces of hardware.

Note that the functions mounted on CU 14, DU 13, and RU 12 illustrated in the first exemplary embodiment are examples, and are not limited thereto. For example, a function for beamforming and multiple-input and multiple-output (MIMO) communication may be included.

Further, in the first exemplary embodiment, the example in which the radio resources are a time resource, a frequency resource, and a combination of the time resource and the frequency resource has been described, but the present disclosure is not limited to this. For example, when multiple signals are spatially multiplexed by at least one of beamforming and MIMO communication, the radio resources may include spatial resources (for example, spatially orthogonal beams and at least one of the spatial streams).

Further, in the first exemplary embodiment, although an example in which UL signals are distributed based on the information regarding the time resource (for example, the information regarding the subframe allocated to each DU) and the information regarding the frequency resource (information regarding the RB allocated to each DU) included in the allocation result information has been described, the present disclosure is not limited to this. For example, when scheduling between the DUs is executed by a combination of time resources and frequency resources, UL signals may be distributed based on at least one of information regarding the time resource and information regarding the frequency resource.

For example, when the RBs corresponding to the indexes 1 to 12 are allocated to DU 13 (DU #1) whose DU ID corresponds to "1" in even subframes, output destination DU determination part 126 of RU 12 outputs the UL signals of the RBs, which are included in respective even subframes and correspond to the indexes 1 to 12, to DU #1.

Alternatively, when the resources described above are allocated to DU #1, output destination DU determination part 126 of RU 12 may output the UL signals of the even subframes to DU #1. Thus, for example, even when the RU does not include the FFT process and it is difficult to distribute the UL signal in the frequency domain, unnecessary output (transfer) of the UL signal can be suppressed, and transmission efficiency of the fronthaul of the UL signal can be improved, by the UL signal distribution in the time domain.

Alternatively, when the above-described resources are allocated to DU #1, output destination DU determination part 126 may output the UL signals of the RBs corresponding to the indexes 1 to 12 of the respective subframes to DU #1. Thus, for example, it is possible to avoid switching the DU as the output destination for every subframe, and thus control for distributing UL signals can be simplified.

Second Exemplary Embodiment

Figure 9:
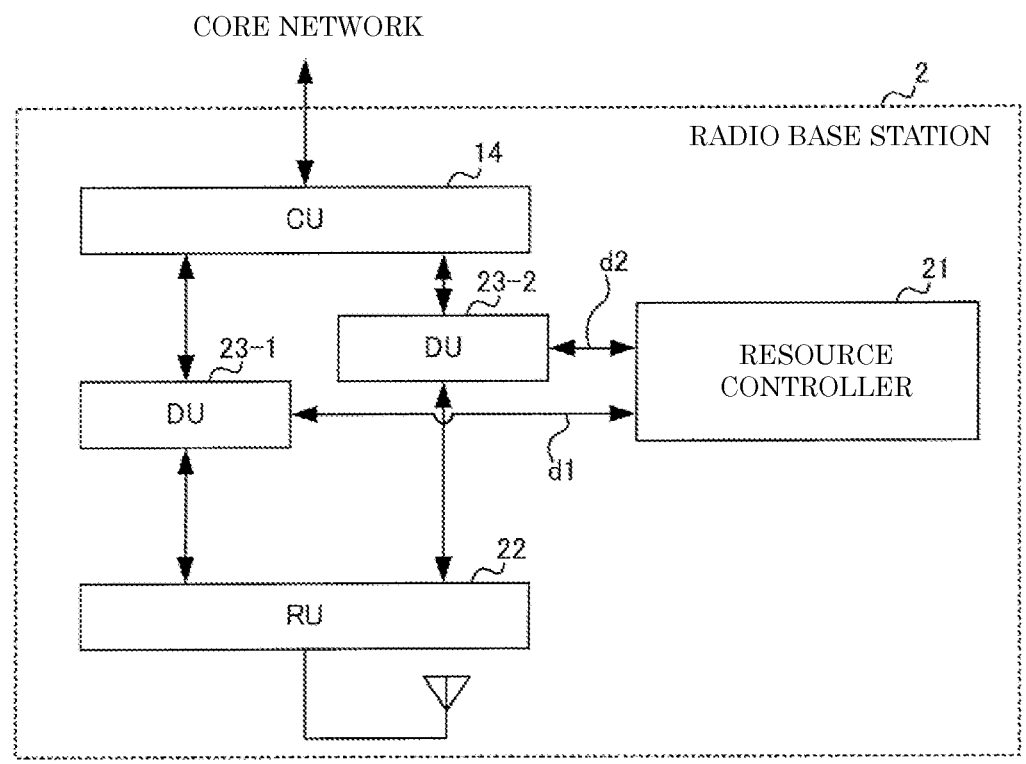
FIG. 9 is a block diagram illustrating a configuration example of a radio base station according to a second exemplary embodiment.

FIG. 9 is a block diagram illustrating a configuration example of radio base station 2 according to a second exemplary embodiment. Note that in FIG. 9, the same reference numbers are assigned to similar components to those in FIG. 2.

Radio base station 2 includes, for example, resource controller 21, RU 22, DU 23-1 and DU 23-2, and CU 14.

Compared to radio base station 1 illustrated in FIG. 2, radio base station 2 illustrated in FIG. 9 differs in that RU 22 and resource controller 21 are not connected.

Connection between CU 14 and DU 23-1, connection between CU 14 and DU 23-2, connection between resource controller 21 and DU 23-1, connection between resource controller 21 and DU 23-2, connection between RU 22 and DU 23-1, and connection between RU 22 and DU 23-2 are made by a communication interface. The communication interface may be either an electrical interface or an optical interface.

Similarly to resource controller 11 illustrated in FIG. 2, resource controller 21 operates in at least one of the CPU, the DSP, and the FPGA mounted on the device.

RU 22 and DU 23 operate on at least one of the CPU, the DSP, and the FPGA mounted on the device, similarly to RU 12 and DU 13 illustrated in FIG. 2, respectively.

Resource controller 21, RU 22, and DU 23 will be described below. Note that in the following example, a configuration in which radio base station 2 receives uplink (UL) signals from the terminal is illustrated.

Figure 10:
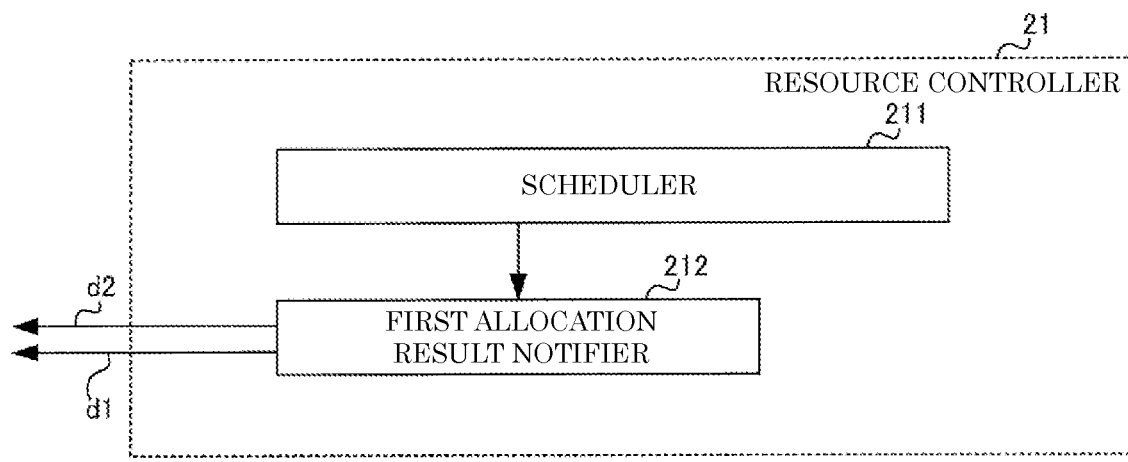
FIG. 10 is a block diagram illustrating a configuration example of a resource controller according to the second exemplary embodiment.

FIG. 10 is a block diagram illustrating a configuration example of resource controller 21 according to the second exemplary embodiment.

Resource controller 21 includes scheduler 211 and first allocation result notifier 212.

Compared to resource controller 11 illustrated in FIG. 3, resource controller 21 illustrated in FIG. 10 differs in that it does not include allocation result generator 113 and second allocation result notifier 114 illustrated in FIG. 3.

Similarly to scheduler 111, scheduler 211 schedules allocation of radio resources available to the system to each DU 23. As a result of scheduling, the radio resource allocation for every DU 23 is determined.

First allocation result notifier 212 connects to DU 23-1 through communication interface d1 and connects to DU 23-2 through communication interface d2. First allocation result notifier 212 receives a result of the radio resource allocation determined by scheduler 211, notifies DU 23-1 of the result of the radio resource allocation through communication interface d1, and notifies DU 23-2 of the result of the radio resource allocation through communication interface d2.

Figure 11:
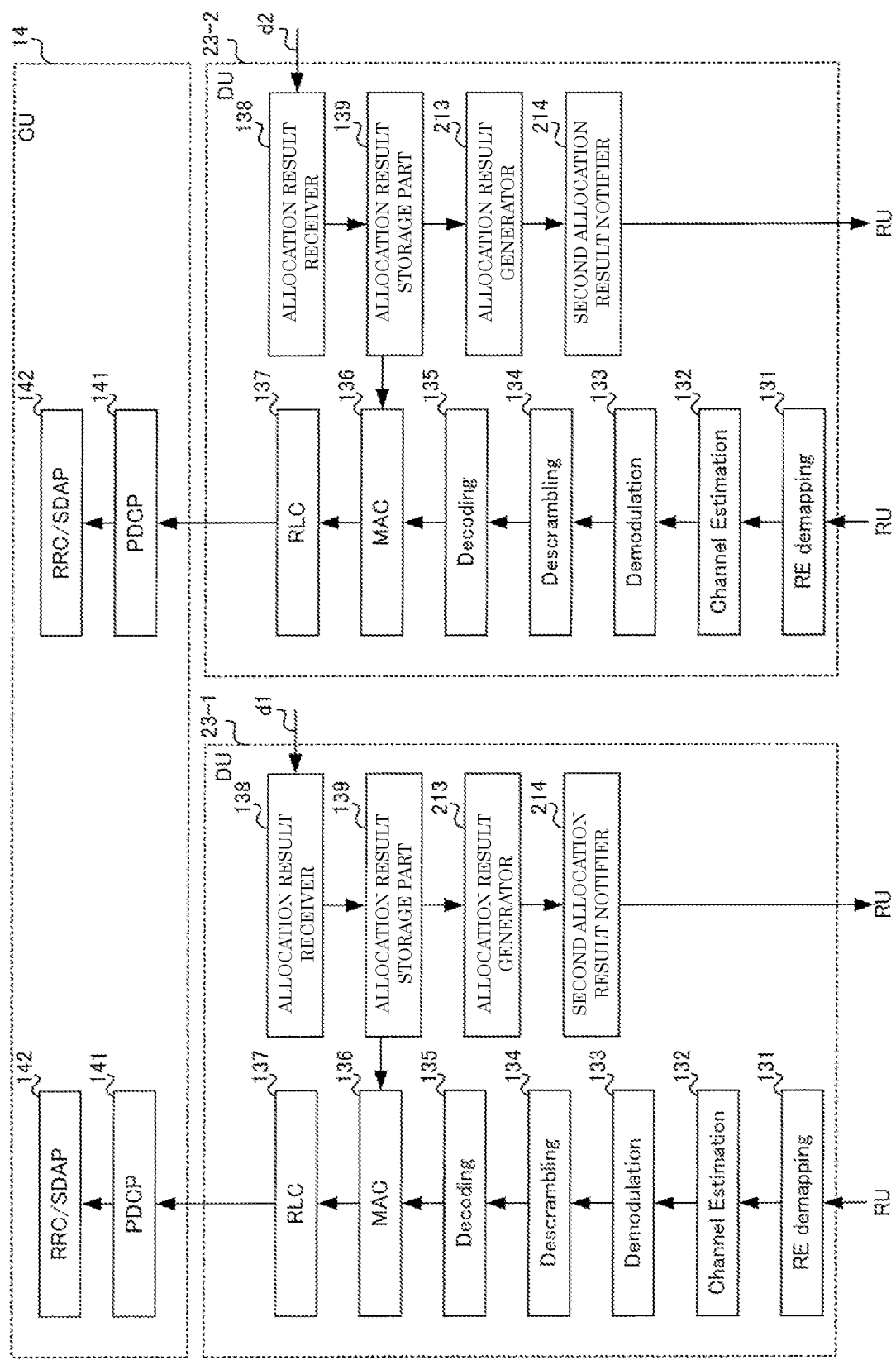
FIG. 11 is a block diagram illustrating a configuration example of a DU and a CU according to the second exemplary embodiment.

FIG. 11 is a block diagram illustrating a configuration example of DU 23 and CU 14 according to the second exemplary embodiment. Note that in FIG. 11, the same reference numbers are assigned to similar components to those in FIG. 5.

Compared to DU 13 (13-1 and 13-2) illustrated in FIG. 5, DU 23 (23-1 and 23-2) illustrated in FIG. 11 differs in that it additionally includes allocation result generator 213 and second allocation result notifier 214.

Allocation result generator 213 generates information to be notified to RU 22. Allocation result generator 213 acquires an allocation result from allocation result storage part 139 and generates allocation result information. The allocation result information may include an identifier of each DU, information regarding the frequency band available for every DU, and available time information. Note that an example of the allocation result information will be described later.

Second allocation result notifier 214 connects to RU 22. Second allocation result notifier 214 notifies RU 22 of the allocation result information generated by allocation result generator 213.

Figure 12:
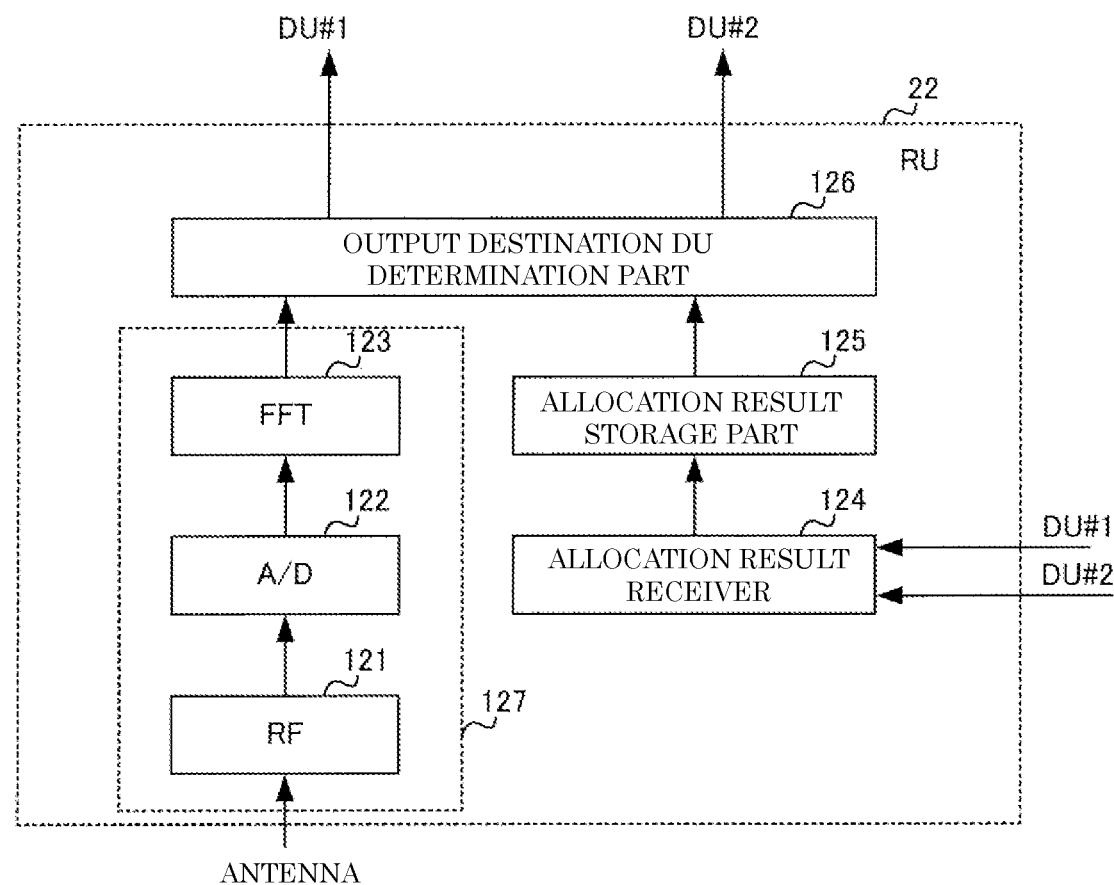
FIG. 12 is a block diagram illustrating a configuration example of an RU according to the second exemplary embodiment.

FIG. 12 is a block diagram illustrating a configuration example of an RU according to the second exemplary embodiment. Note that in FIG. 12, the same reference numbers are assigned to components similar to those in FIG. 4.

Compared to RU 12 illustrated in FIG. 4, RU 22 illustrated in FIG. 12 differs in that allocation result receiver 124 receives the allocation result information from DU 23 instead of resource controller 11.

For example, allocation result receiver 124 receives the allocation result information from each of DU 23-1 and DU 23-2.

Next, an example of the allocation result information and determination of the DU as the output destination based on the allocation result information in the second exemplary embodiment will be described.

Figures 13A, 13B:
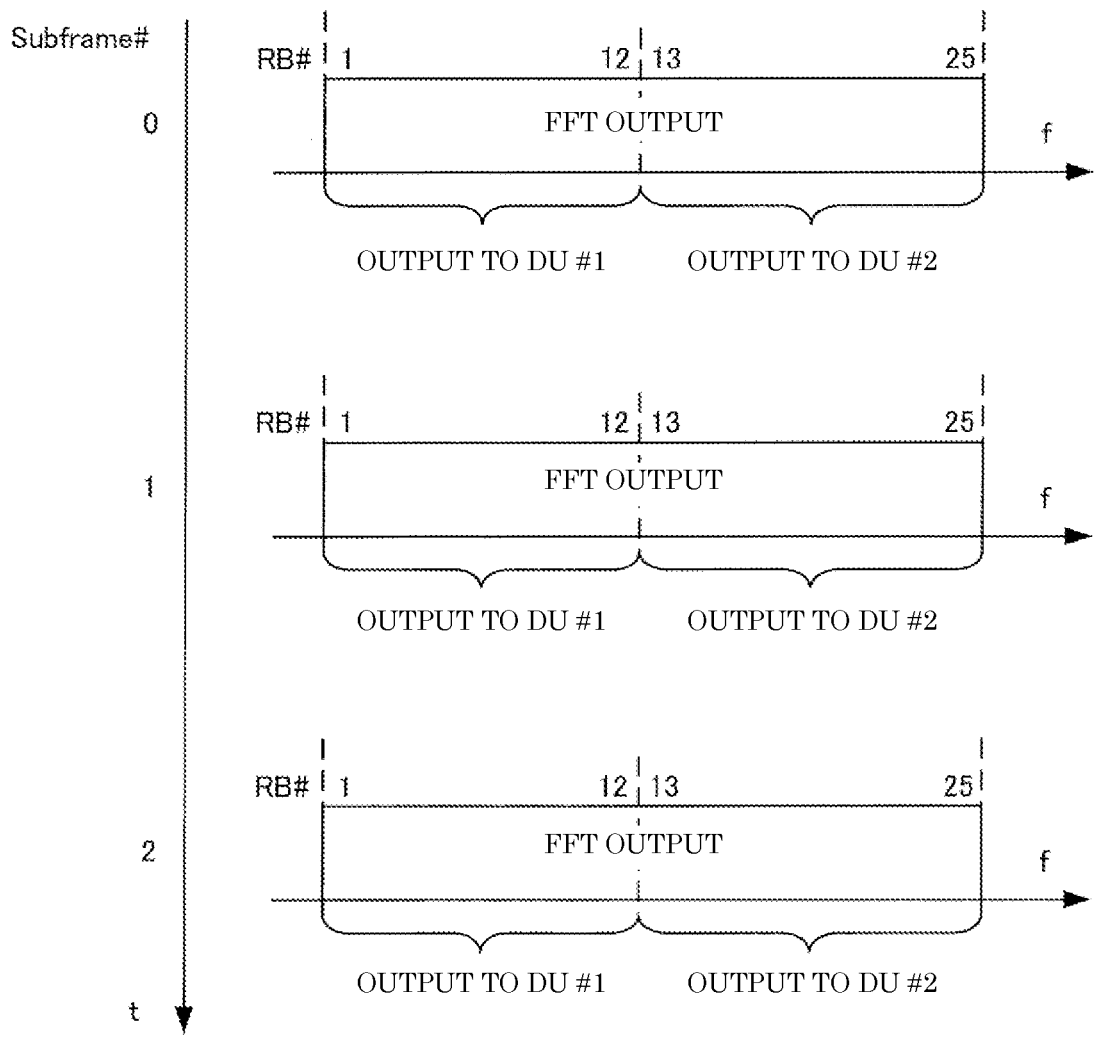
FIG. 13A is a diagram illustrating a third example of allocation result information.
FIG. 13B is a diagram illustrating an example of determining the DU as the output destination based on the third example of the allocation result information illustrated in FIG. 13A.

FIG. 13A is a diagram illustrating a third example of the allocation result information. FIG. 13B is a diagram illustrating an example of determining the DU as the output destination based on the third example of the allocation result information illustrated in FIG. 13A.

The allocation result information illustrated in FIG. 13A includes allocation result information #1 and allocation result information #2. Allocation result information #1 is notified from DU #1 to RU 22. Allocation result information #1 includes ID of DU #1, a start index of an RB available in DU #1, a number of available RBs, and information regarding available subframes. Allocation result information #2 is notified from DU #2 to RU 22. Allocation result information #2 includes ID of DU #2, a start index of an RB available in DU #2, a number of available RBs, and information regarding available subframes.

Describing the relationship between FIG. 6A and FIG. 13A, the allocation result information illustrated in FIG. 6A is information regarding the respective allocation results for DU #1 and DU #2, and is notified from resource controller 11 to RU 12. On the other hand, among the allocation result information illustrated in FIG. 13A, allocation result information #1 is information regarding an allocation result for DU #1, and is notified from DU #1 to RU 22, and allocation result information #2 is information regarding an allocation result for DU #2, and is notified from DU #2 to RU 22.

In FIG. 12, output destination DU determination part 126 determines the output destination DU based on the allocation result information and outputs a signal.

FIG. 13B illustrates an example of output to the DU as the output destination in output destination DU determination part 126.

For example, output destination DU determination part 126 outputs signals in the frequency band corresponding to indexes 1 to 12 to DU #1, and outputs signals in the frequency band corresponding to indexes 13 to 25 to DU #2 in each of three subframes #0 to #2.

Figure 14:
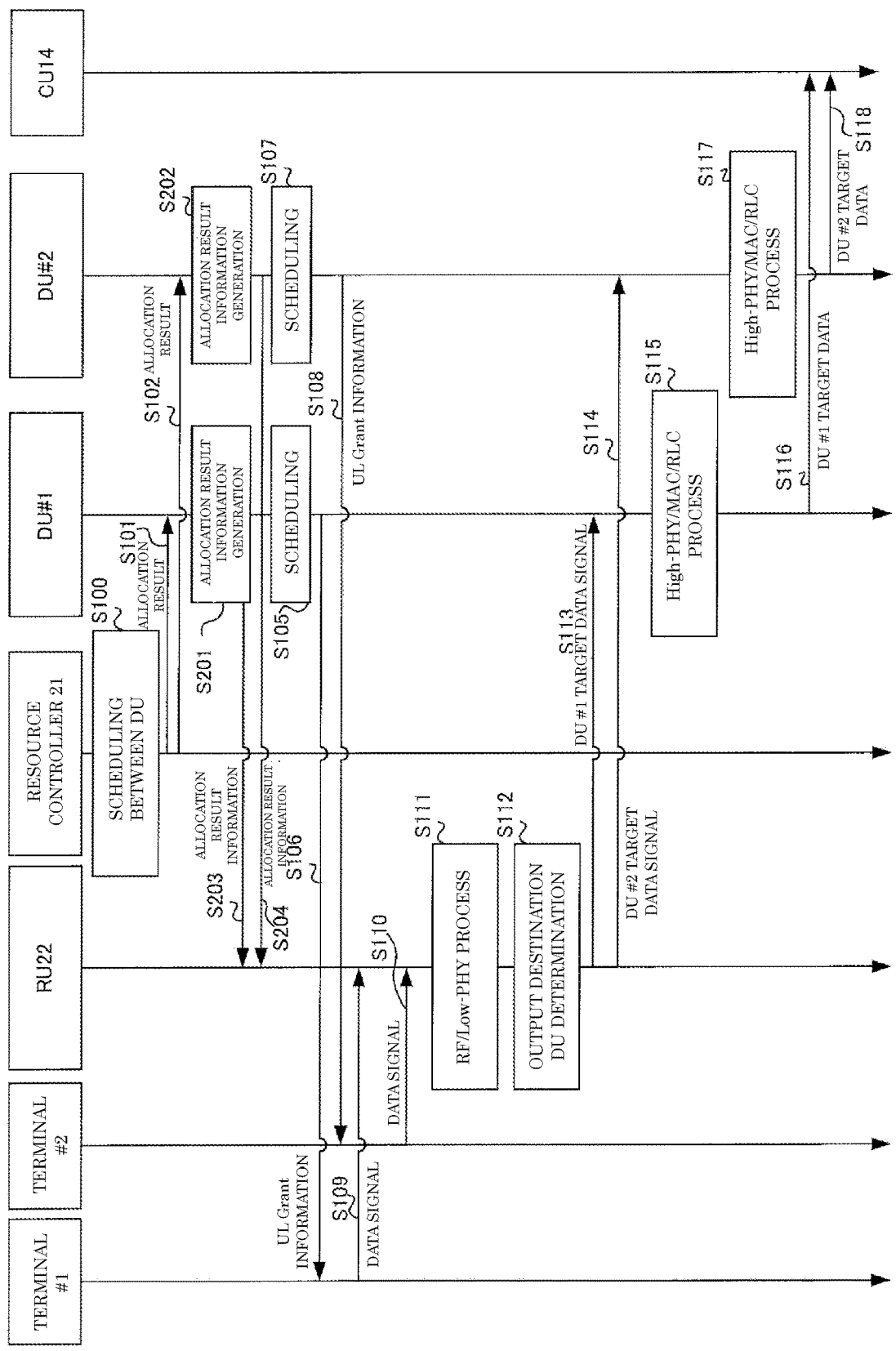
FIG. 14 is a sequence diagram of the radio base station and a terminal according to the second exemplary embodiment.

FIG. 14 is a sequence diagram of a radio base station and a terminal according to the second exemplary embodiment. In FIG. 14, the same reference numbers are assigned to similar components to those in FIG. 8.

In the sequence illustrated in FIG. 14, instead of resource controller 21 notifying RU 22 of the allocation result information (see S104 in FIG. 8), the DU notifies RU 22 of the allocation result information.

For example, in FIG. 14, DU #1 generates allocation result information (S201) and notifies RU 22 of the allocation result information (S203). Further, DU #2 generates allocation result information (S202) and notifies RU 22 of the allocation result information (S204). Here, the allocation result information notified by DU #1 and the allocation result information notified by DU #2 may be different from each other as illustrated in FIG. 13A. Further, either of the notifications to RU 22 (S203 and S204) may be earlier in the order, or the notifications may be executed in parallel.

As described above, in the second exemplary embodiment, DU 23 outputs the allocation result information generated based on the information received from resource controller 21 to RU 22, and RU 22 determines the output destination DU for UL signals based on the allocation result information. Then, RU 22 outputs a UL signal to an appropriate DU according to a determination result. With this configuration, unnecessary output (transfer) of the UL signal can be suppressed, so that it is possible to avoid excessive (unnecessary) consumption of the band of the fronthaul, and it is possible to improve transmission efficiency of the UL signal in the fronthaul.

Further, even if the resource allocation between DUs is changed, RU 22 can receive the updated allocation result information, and thus efficient data transfer can be achieved by following changes in the resource allocation.

Further, in the second exemplary embodiment, since the allocation result information can be notified to the RU in the communication interface connecting the DU and the RU, it is possible to avoid laying a communication interface between the resource controller and the RU.

Note that in the second exemplary embodiment, the example in which the two DUs have similar configurations has been described, but the present disclosure is not limited to this. For example, the DU illustrated in the first exemplary embodiment (for example, DU 13) and the DU illustrated in the second exemplary embodiment (for example, DU 23) may be mixed. In this case, since the DU illustrated in the first exemplary embodiment does not notify the RU of the allocation result information, the RU may acquire the allocation result information from the resource controller instead of acquiring the allocation result information from the DU. When the RU acquires the allocation result information from the resource controller, the functions of allocation result generator 213 and second allocation result notifier 214 of DU 23 may be stopped.

Third Exemplary Embodiment

Figure 15:
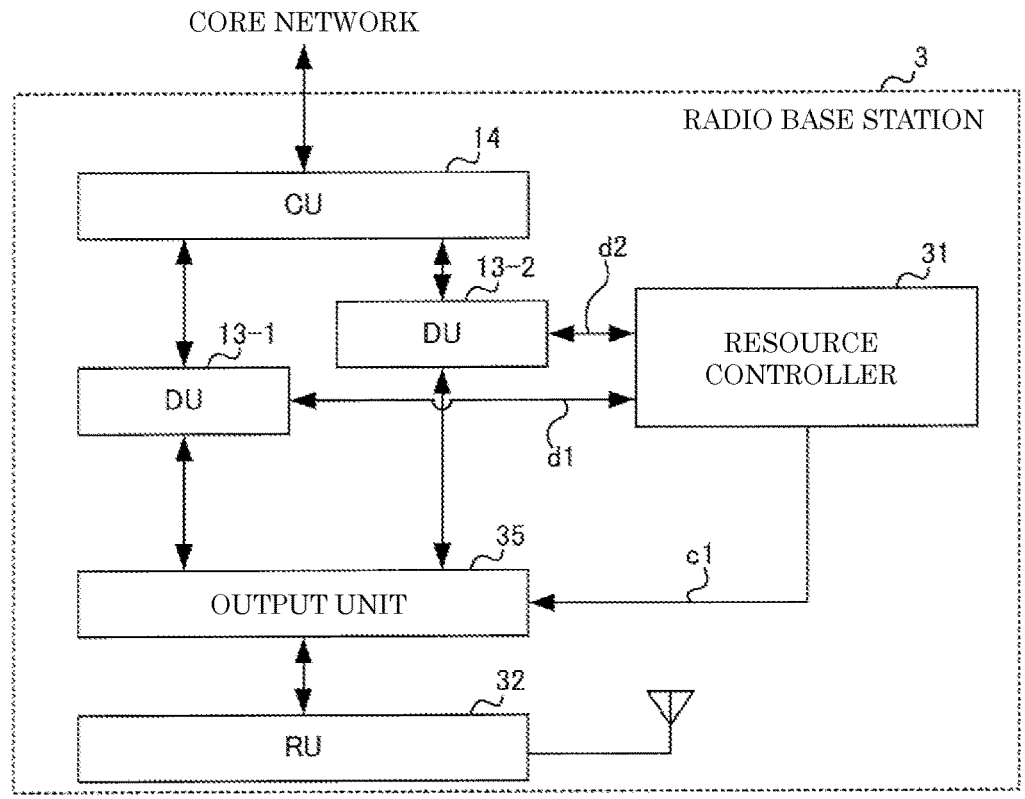
FIG. 15 is a block diagram illustrating a configuration example of a radio base station according to a third exemplary embodiment.

FIG. 15 is a block diagram illustrating a configuration example of radio base station 3 according to a third exemplary embodiment. Note that in FIG. 15, the same reference numbers are assigned to similar components to those in FIG. 2 or 9.

Radio base station 3 includes, for example, resource controller 31, RU 32, DU 13-1 and DU 13-2, CU 14, and output unit 35.

Connection between resource controller 31 and output unit 35, connection between resource controller 31 and DU 13-1, connection between resource controller 31 and DU 13-2, connection between output unit 35 and RU 32, connection between output unit 35 and DU 13-1, and connection between output unit 35 and DU 13-2 are made by a communication interface. The communication interface may be either an electrical interface or an optical interface.

Figure 16:
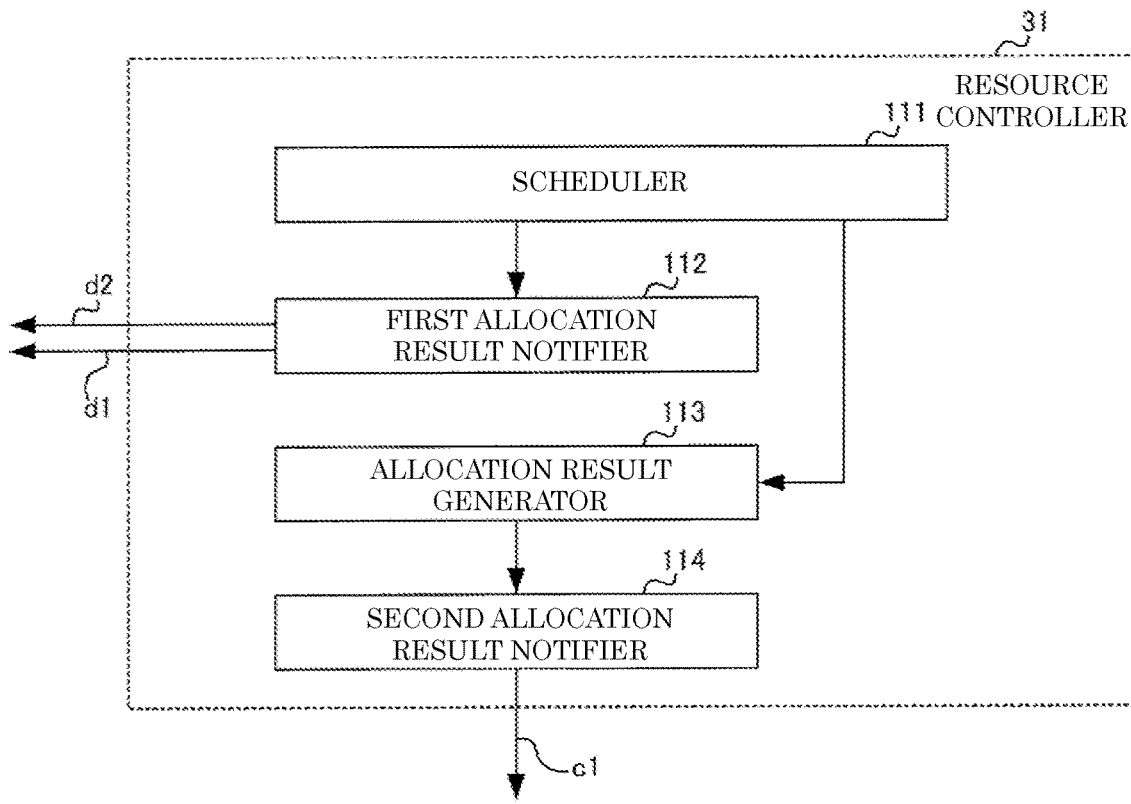
FIG. 16 is a block diagram illustrating a configuration example of a resource controller according to the third exemplary embodiment.

FIG. 16 is a block diagram illustrating a configuration example of resource controller 31 according to the third exemplary embodiment. Note that in FIG. 16, the same reference numbers are assigned to similar components to those in FIG. 3.

Compared to resource controller 11 illustrated in FIG. 3, resource controller 31 illustrated in FIG. 16 differs in that output unit 35 is notified of the allocation result information by second allocation result notifier 114 illustrated in FIG. 3.

For example, second allocation result notifier 114 connects to output unit 35 through communication interface cl. Second allocation result notifier 114 notifies output unit 35 of the allocation result information generated by allocation result generator 113.

Figure 17:
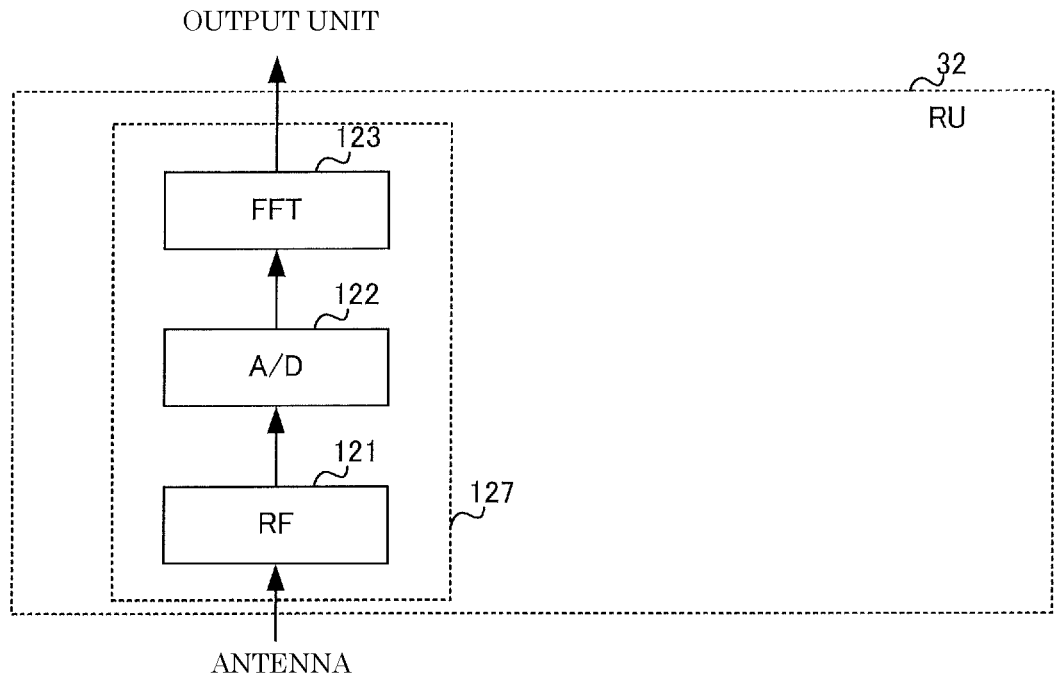
FIG. 17 is a block diagram illustrating a configuration example of an RU according to the third exemplary embodiment.

FIG. 17 is a block diagram illustrating a configuration example of RU 32 according to the third exemplary embodiment. Note that in FIG. 17, the same reference numbers are assigned to similar components to those in FIG. 4.

Compared to RU 12 illustrated in FIG. 4, RU 32 illustrated in FIG. 17 differs in that it does not include allocation result receiver 124, allocation result storage part 125, and output destination DU determination part 126 illustrated in FIG. 4, and the UL signal subjected to the FFT process by FFT part 123 is output to output unit 35.

Figure 18:
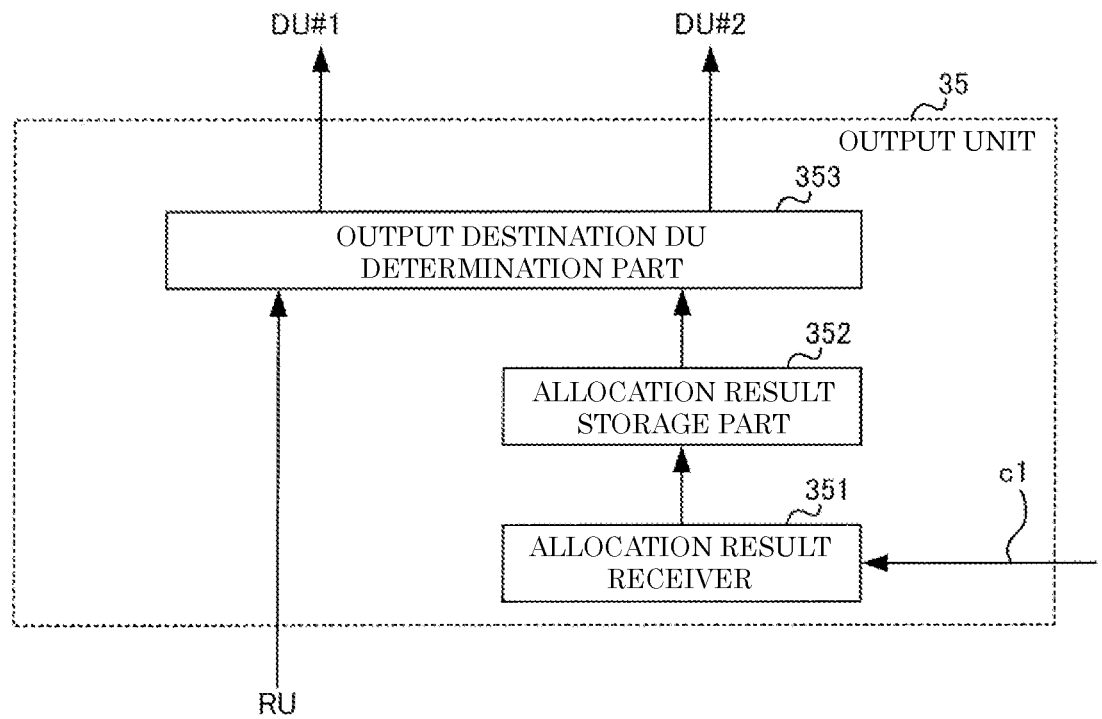
FIG. 18 is a block diagram illustrating a configuration example of an output unit according to the third exemplary embodiment.

FIG. 18 is a block diagram illustrating a configuration example of output unit 35 according to the third exemplary embodiment.

Output unit 35 includes allocation result receiver 351, allocation result storage part 352, and output destination DU determination part 353.

Allocation result receiver 351 connects to resource controller 31 through communication interface cl. Allocation result receiver 351 receives the allocation result information from resource controller 31. Allocation result receiver 351 stores the allocation result information in allocation result storage part 352.

Output destination DU determination part 353 determines DU 13 as the output destination of the UL signal output from RU 32 based on the allocation result information stored in allocation result storage part 352. Then, output destination DU determination part 353 outputs the UL signal to DU 13 (DU 13-1 or DU 13-2) based on a determination result. Note that an example of determination in output destination DU determination part 353 may be similar to the example of determination in output destination DU determination part 126 of the first exemplary embodiment.

Figure 19:
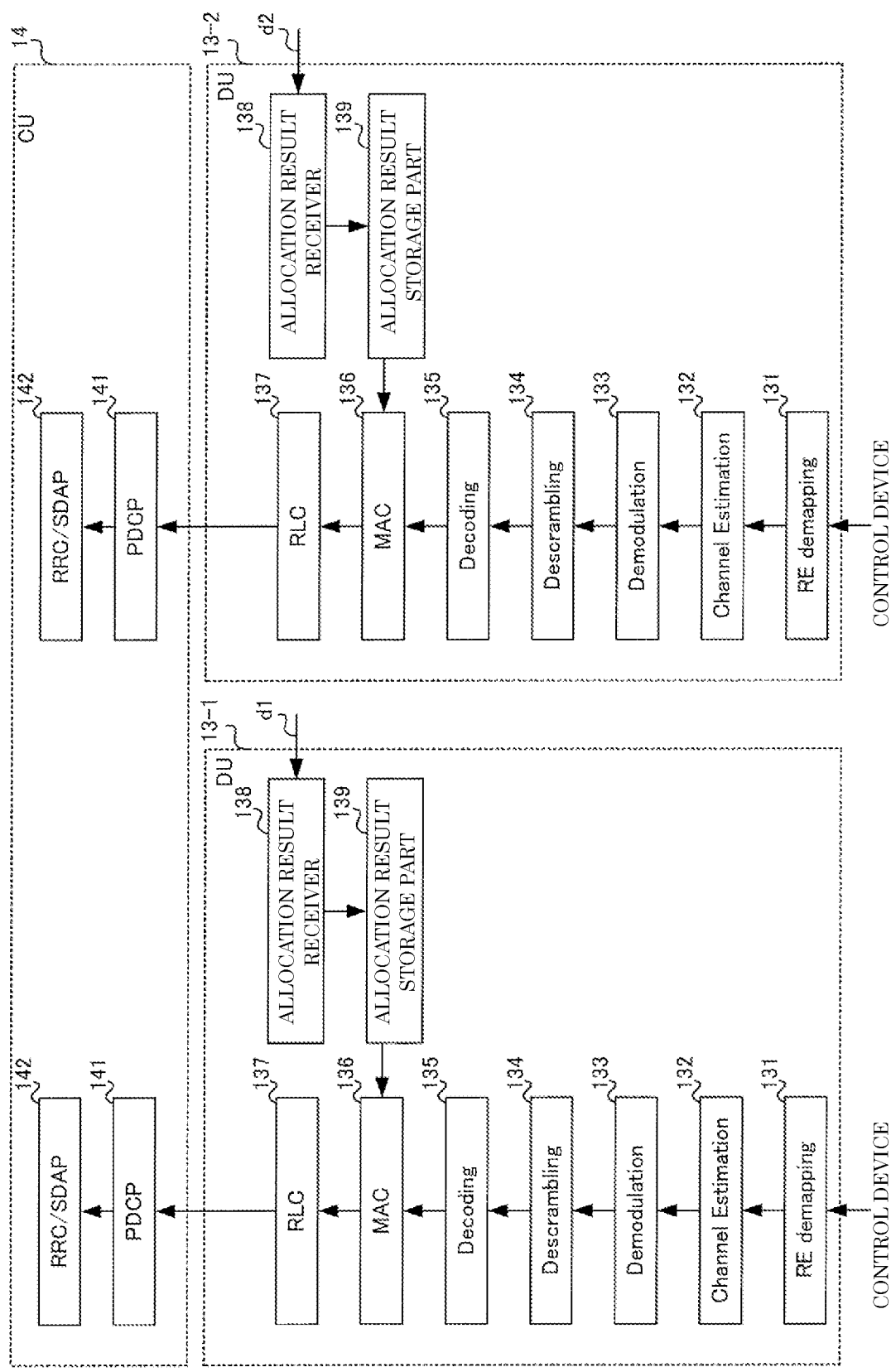
FIG. 19 is a block diagram illustrating a configuration example of a DU and a CU according to the third exemplary embodiment.

FIG. 19 is a block diagram illustrating a configuration example of DU 13 and CU 14 according to the third exemplary embodiment.

Compared to DU 13 and CU 14 illustrated in FIG. 5, DU 13 and CU 14 illustrated in FIG. 19 differ in that RE demapping part 131 receives the UL signal from output unit 35 instead of RU 12.

Figure 20:
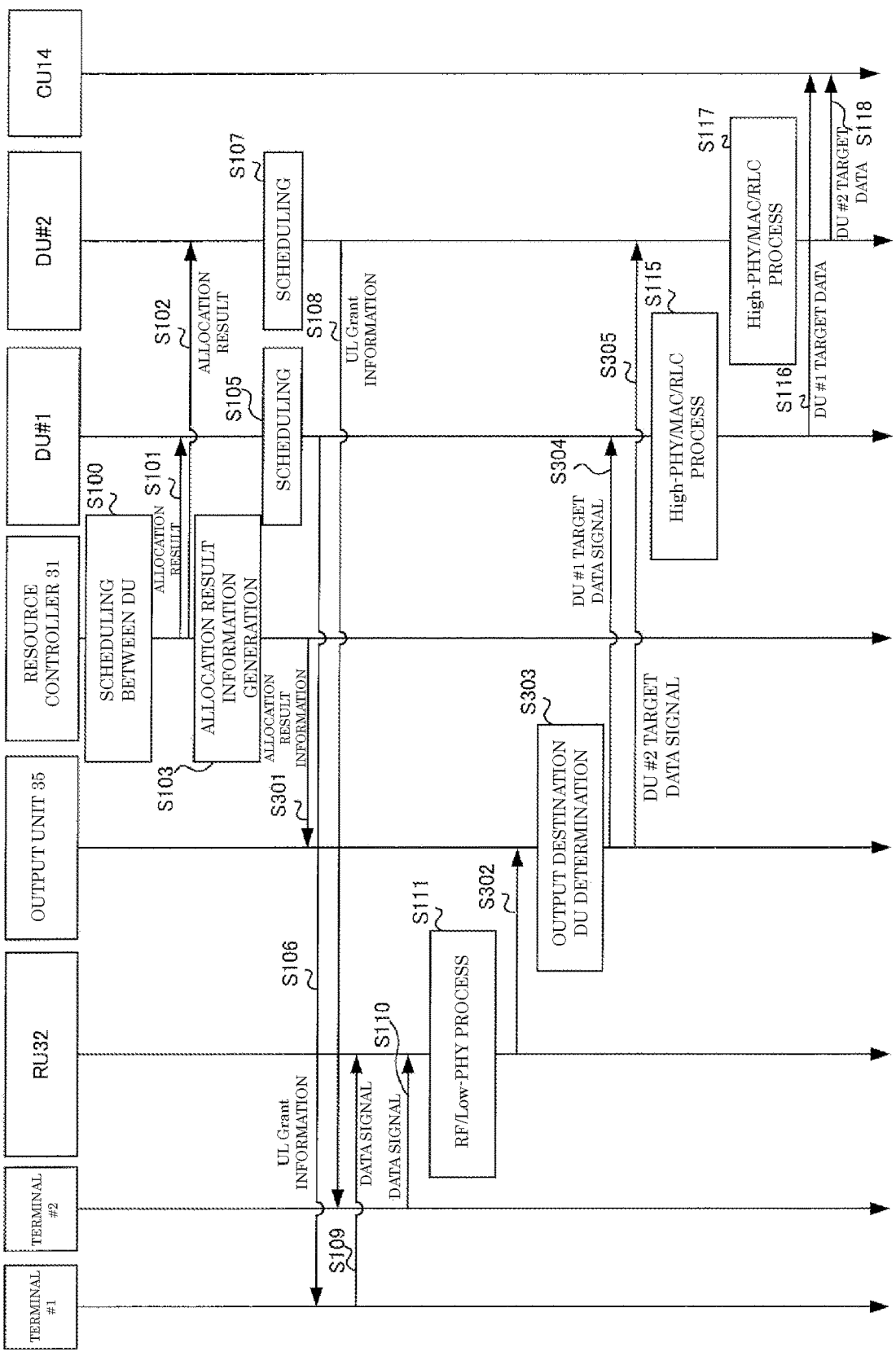
FIG. 20 is a sequence diagram of a radio base station and a terminal according to the third exemplary embodiment.

FIG. 20 is a sequence diagram of radio base station 3 and the terminal according to the third exemplary embodiment. In FIG. 20, the same reference numbers are assigned to similar components to those in FIG. 8.

In the sequence illustrated in FIG. 20, resource controller 31 notifies output unit 35 of the allocation result information (S301).

RU 32 outputs received data to output unit 35 (S302).

Output unit 35 determines the DU of the output destination of the received data (S303). Based on a determination result, output unit 35 outputs data for DU #1 (target data) to DU #1 (S304) and outputs data for DU #2 to DU #2 (S305) among the received data. Note that the process of S304 and the process of S305 may be simultaneous or partially overlapped in time.

As described above, in the third exemplary embodiment, resource controller 31 outputs the allocation result information to output unit 35 provided between RU 32 and DU 13, and output unit 35 determines DU 13 as the output destination for the UL signal based on the allocation result information. Then, output unit 35 outputs the UL signal to appropriate DU 13 according to a determination result. With this configuration, unnecessary output (transfer) of the UL signal can be suppressed, so that it is possible to avoid excessive (unnecessary) consumption of the band of the fronthaul, and it is possible to improve transmission efficiency of the UL signal of the fronthaul.

Further, even if the resource allocation between DUs is changed, resource controller 31 can update the allocation result information and notify output unit 35 of the updated allocation result information, and thus efficient data transfer can be achieved by following changes in the resource allocation.

Further, in the third exemplary embodiment, a configuration is employed in which output unit 35 determines DU 13 as the output destination and outputs the UL signal to appropriate DU 13 according to a determination result. Therefore, the function of RU 32 can be simplified, and for example, even when it is difficult to implement the function in the RU, such as when a device having the function corresponding to RU 32 is purchased from an external vendor, transmission efficiency of the UL signal in the fronthaul can be improved by connecting output unit 35.

Note that in the third exemplary embodiment, the example in which the allocation result information is notified from the resource controller to the output unit has been described, but the present disclosure is not limited to this. For example, as in the example illustrated in the second exemplary embodiment, the allocation result information may be notified from the DU to the output unit. For example, when the allocation result information is notified from the DU to the output unit, communication interface cl may be omitted.

Further, in the third exemplary embodiment, an example in which the resource controller and the output unit are separate devices from each other has been described, but the present disclosure is not limited to this. For example, the resource controller may be mounted on the output unit connected between the RU and the DU. In this configuration, for example, the resource controller notifies the DU of the allocation result via the communication interface between the DU and the output unit, and thus communication interface d1 and communication interface d2 can be omitted. Further, since the notification from the resource controller to the RU is performed via the communication interface between the RU and the output unit, communication interface cl can be omitted.

Fourth Exemplary Embodiment

Figure 21:
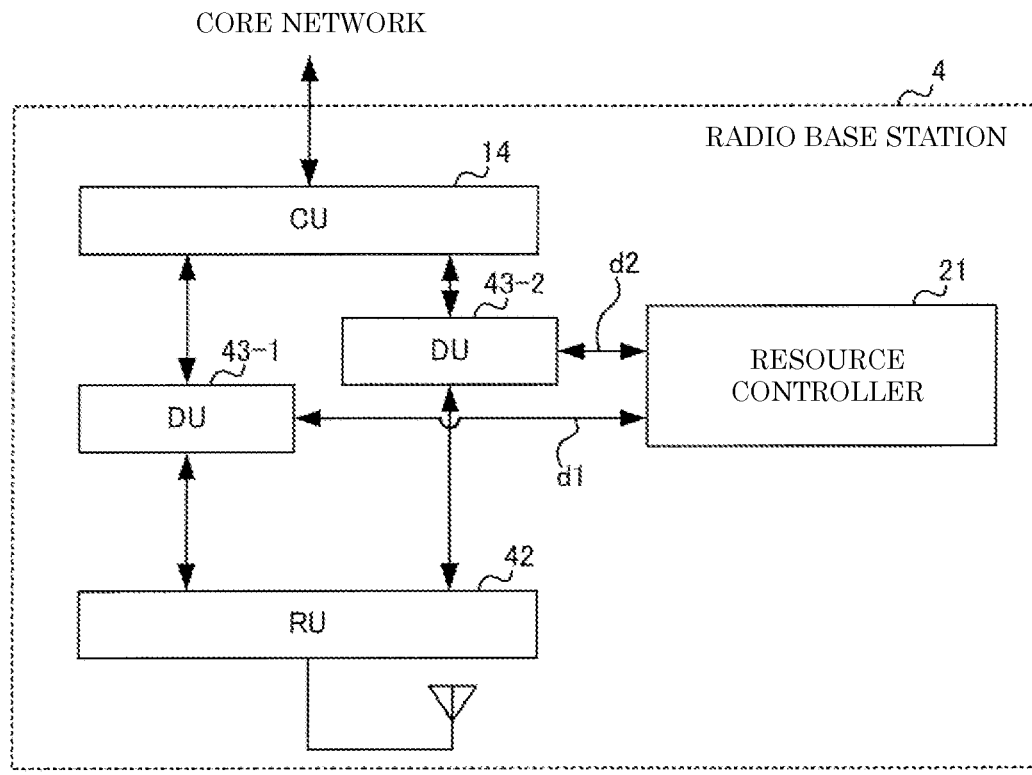
FIG. 21 is a block diagram illustrating a configuration example of a radio base station according to a fourth exemplary embodiment.

FIG. 21 is a block diagram illustrating a configuration example of radio base station 4 according to a fourth exemplary embodiment. Note that in FIG. 21, the same reference numbers are assigned to similar components to those in FIG. 9.

Radio base station 4 includes, for example, resource controller 21, RU 42, DU 43-1 and DU 43-2, and CU 14.

Compared to radio base station 1 illustrated in FIG. 2, radio base station 4 illustrated in FIG. 21 differs in that RU 42 and resource controller 21 are not connected. In other words, in the fourth exemplary embodiment, RU 42 does not have to be controlled by resource controller 21.

Connection between CU 14 and DU 43-1, connection between CU 14 and DU 43-2, connection between resource controller 21 and DU 43-1, connection between resource controller 21 and DU 43-2, connection between RU 42 and DU 43-1, and connection between RU 42 and DU 43-2 are made by a communication interface. The communication interface may be either an electrical interface or an optical interface.

Figure 22:
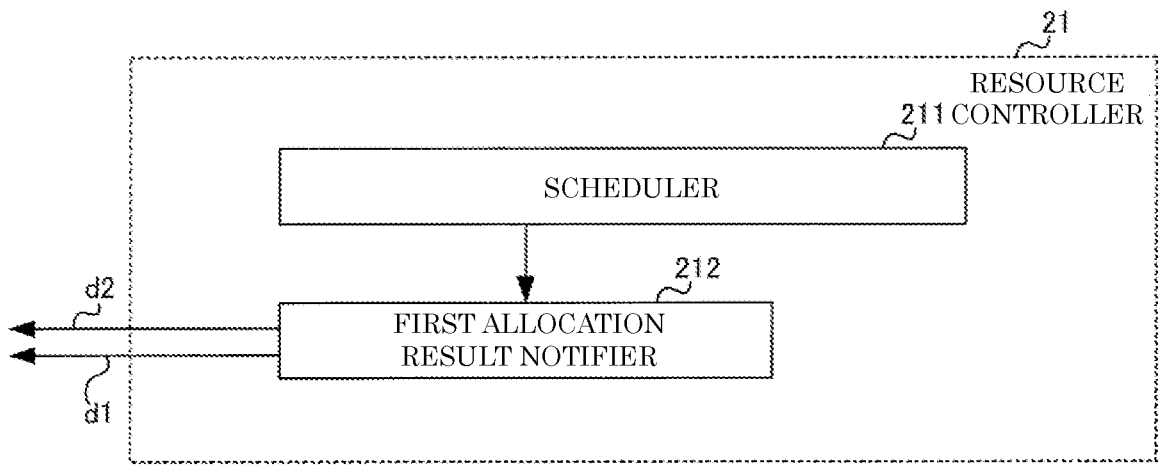
FIG. 22 is a block diagram illustrating a configuration example of a resource controller according to the fourth exemplary embodiment.

FIG. 22 is a block diagram illustrating a configuration example of resource controller 21 according to the fourth exemplary embodiment. Resource controller 21 according to the fourth exemplary embodiment may have a similar configuration to that of resource controller 21 illustrated in FIG. 10, for example.

Figure 23:
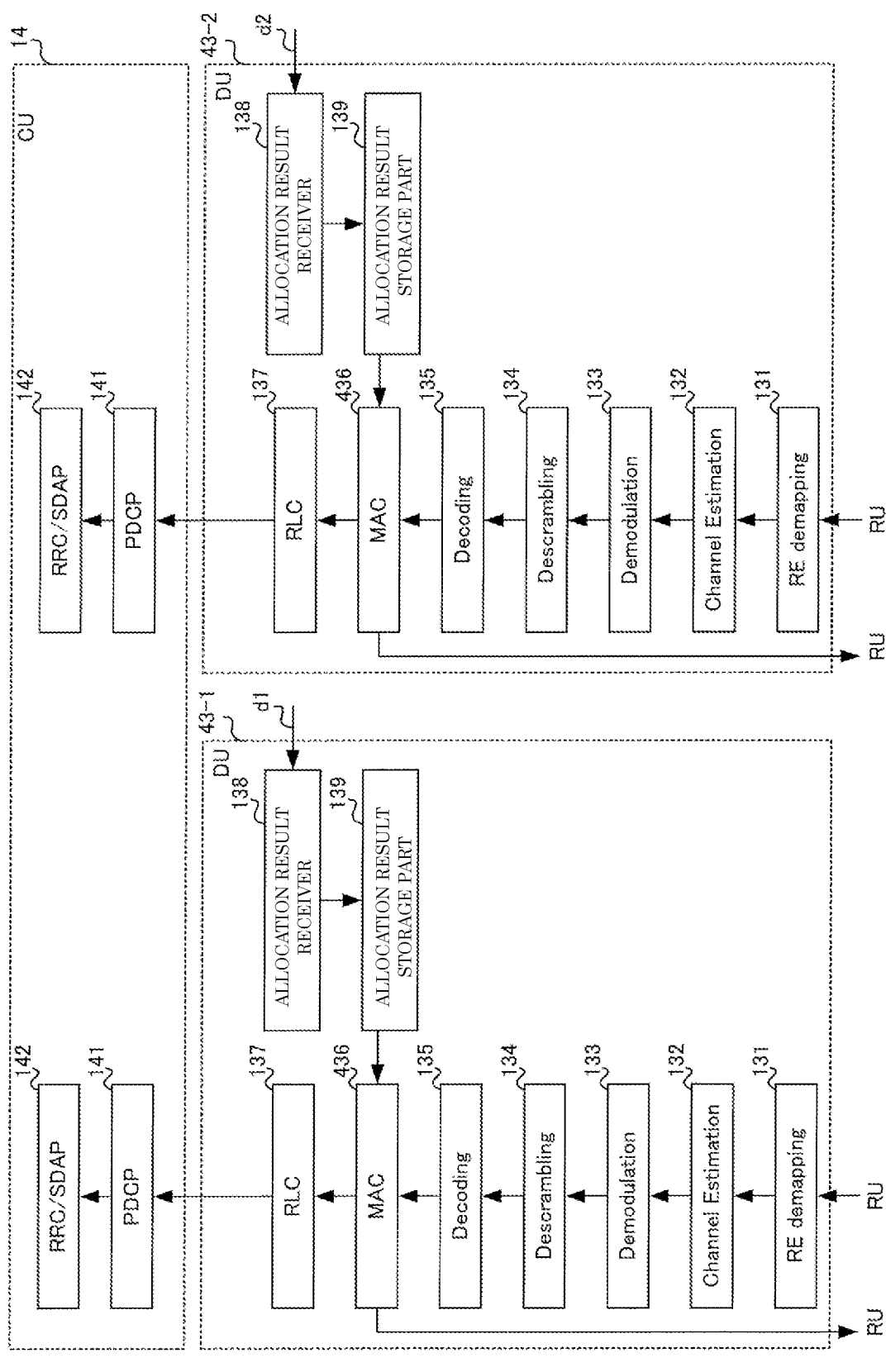
FIG. 23 is a block diagram illustrating a configuration example of a DU and a CU according to the fourth exemplary embodiment.

FIG. 23 is a block diagram illustrating a configuration example of DU 43 and CU 14 according to the fourth exemplary embodiment. Note that in FIG. 23, the same reference numbers are assigned to similar components to those in FIG. 5.

Compared to DU 13 illustrated in FIG. 5, DU 43 illustrated in FIG. 23 is different in that MAC part 436 outputs the reception parameter to RU 42.

For example, MAC part 436 generates a reception parameter necessary for receiving UL signals based on an allocation result. The reception parameter includes, for example, a frequency band and time information and the like related to a reception process. The reception parameter may be a reception parameter described in the ORAN standard (ORAN-WG4.CUS.0-v02.00, P60).

MAC part 436 divides a transport block based on the reception parameter and information (for example, packet information) described in a header included in the transport block acquired from decoder 135, and outputs a block after being divided to RLC part 137.

Further, MAC part 436 outputs the reception parameter to RU 42.

Figure 24:
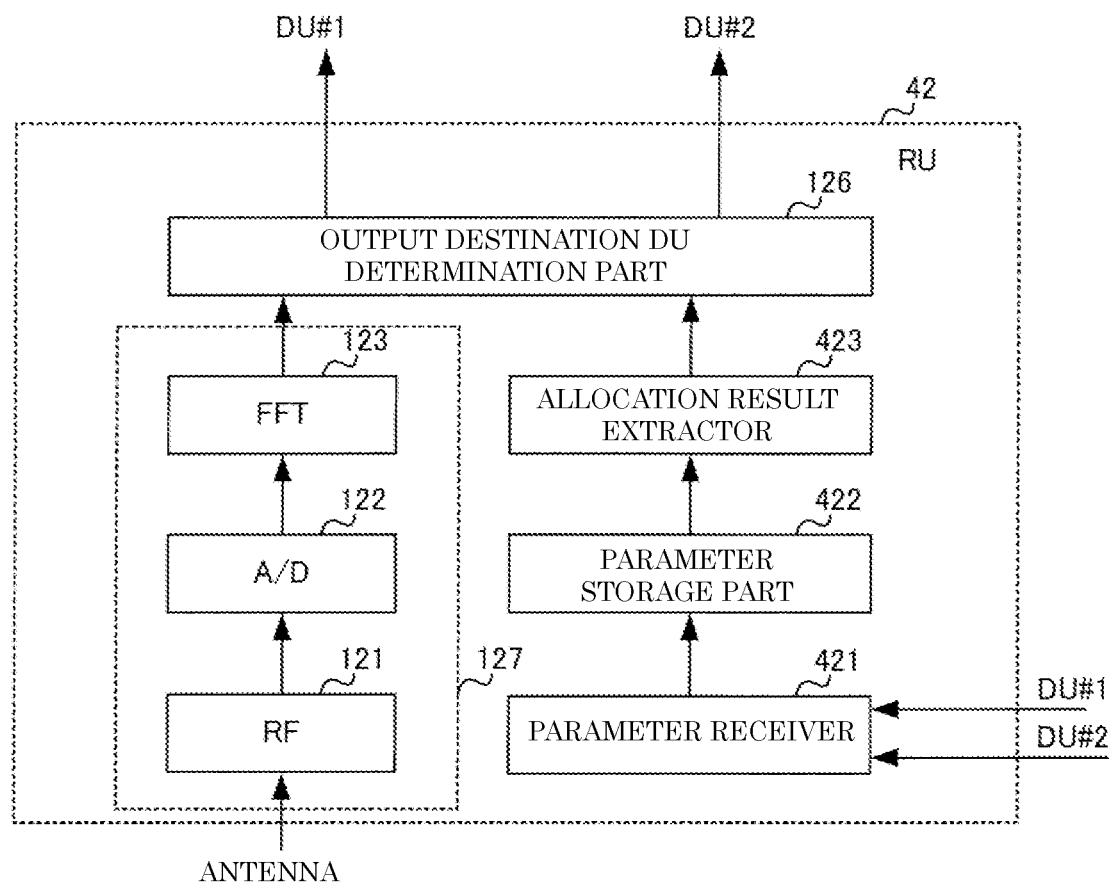
FIG. 24 is a block diagram illustrating a configuration example of an RU according to the fourth exemplary embodiment.

FIG. 24 is a block diagram illustrating a configuration example of RU 42 according to the fourth exemplary embodiment. Note that in FIG. 24, the same reference numbers are assigned to similar components to those in FIG. 4.

Compared to RU 12 illustrated in FIG. 4, RU 42 illustrated in FIG. 24 differs in that allocation result receiver 124 and allocation result storage part 125 in FIG. 4 are replaced with parameter receiver 421, parameter storage part 422, and allocation result extractor 423, respectively.

Parameter receiver 421 receives information indicating the reception parameter from DU 43-1 and DU 43-2. Parameter receiver 421 stores the received parameter in parameter storage part 422.

Allocation result extractor 423 extracts information for determining the DU as the transmission destination from the parameter stored in parameter storage part 422, and generates allocation result information. The allocation result information to be generated may be, for example, the allocation result information illustrated in FIG. 6A or FIG. 7A.

Output destination DU determination part 126 determines output destination DU 43 of a UL signal output from FFT part 123 based on the allocation result information generated by allocation result extractor 423. Then, output destination DU determination part 126 outputs the UL signal to DU 43 (DU 43-1 or DU 43-2) based on a determination result. Note that the example of determination in output destination DU determination part 126 may be similar to that in the first exemplary embodiment.

Figure 25:
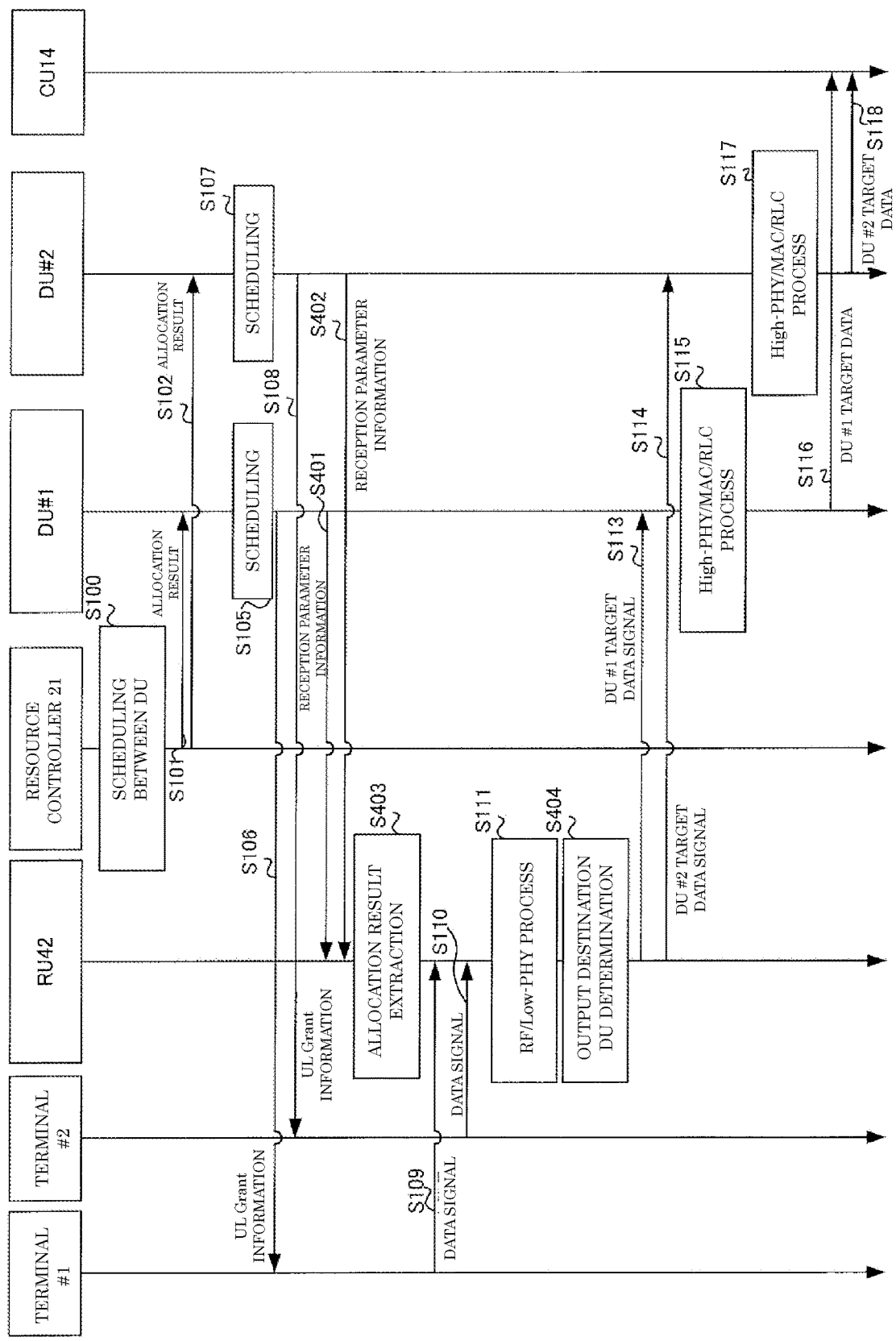
FIG. 25 is a sequence diagram of a radio base station and a terminal according to the fourth exemplary embodiment.

FIG. 25 is a sequence diagram of the radio base station and the terminal according to the fourth exemplary embodiment. Note that in FIG. 25, the same reference numbers are assigned to similar processes to those in FIG. 8.

In the sequence illustrated in FIG. 25, after DU #1 notifies terminal #1 of UL grant information (after S106), DU #1 notifies RU 42 of reception parameter information (S401). Note that the order of the process of S401 and the process of S106 is not limited to this, and for example, S106 may be executed after the process of S401.

Also, after DU #2 notifies terminal #2 of the UL grant information (after S108), DU #2 notifies RU 42 of reception parameter information (S402). Note that the order of the process of S402 and the process of S108 is not limited to this, and for example, S108 may be executed after the process of S402. Further, either of the process of S401 and the process of S402 may be earlier in the order, or the processes may be executed in parallel.

RU 42 extracts an allocation result from the received parameters (S403).

RU 42 receives data transmitted by terminal #1 in S109 and data transmitted by terminal #2 in S110, and performs an RF process and a low-PHY process on a received data signal (S111).

RU 42 determines the DU of the output destination of the received data based on the extracted allocation result (S404).

As described above, in the fourth exemplary embodiment, DU 43 outputs the parameter generated based on the information received from resource controller 21 to RU 42, and RU 42 generates the allocation result information from the parameter, and determines DU 43 as the output destination for the UL signal based on the allocation result information. Then, RU 42 outputs the UL signal to an appropriate DU according to a determination result. With this configuration, unnecessary output (transfer) of the UL signal can be suppressed, so that it is possible to avoid excessive (unnecessary) consumption of the band of the fronthaul, and it is possible to improve transmission efficiency of the UL signal in the fronthaul.

Further, even if the resource allocation between the DUs is changed, RU 42 can receive the updated allocation result information, and thus efficient data transfer can be achieved by following changes in the resource allocation.

Further, in the fourth exemplary embodiment, since the parameter can be notified to the RU in communication interface connecting DU 43 and RU 42, it is possible to avoid laying the communication interface between the resource controller and the RU, and transmission efficiency of the fronthaul of the UL signal can be improved.

Further, in the fourth exemplary embodiment, since the information for determining the output destination DU is extracted from the parameter used for transmission and reception to and from the terminal, resource controller 21 and DU 43 do not have to be provided with a configuration for generating the allocation result information. Therefore, it is possible to simplify the configuration of each device and reduce the cost for developing and maintaining the device. Moreover, since there is no output of the allocation result information, signaling can be reduced.

Note that in the fourth exemplary embodiment described above, the example has been described in which the parameter notified from DU 43 to RU 42 is the reception parameter used for UL reception, but the present disclosure is not limited to this. For example, in a case of sharing by dividing in the frequency domain in resource sharing between DUs, in a system in which the bands used for downlink transmission and uplink reception are in common, resource allocation information included in a transmission parameter for downlink transmission in the RU may be used to generate the allocation result information for determining the output destination DU.

Note that any two or more of the above-described exemplary embodiments may be combined.

Further, at least one of the CU, the BU, and the RU in each of the above-described exemplary embodiments may be achieved by a logical "slice" using virtualization technology. For example, each of the functional blocks contained in the CU, the BU, and the RU may be generated by slicing.

Further, in each of the above-described exemplary embodiments, the unit of the time resource is not limited to the subframe, and may be another time resource unit such as a slot and a symbol. Further, in each of the above-described exemplary embodiments, the unit of the frequency resource may be another frequency resource unit such as bandwidth part (BWP) or physical resource block (PRB).

Further, the configuration example of the radio base station according to each of the above-described exemplary embodiments is an example, and the present disclosure is not limited to this. For example, the radio base station may have three or more DUs. In this case, the signal received by the RU may be distributed to any of three or more DUs. Further, the radio base station may have two or more RUs, or may have two or more CUs. Furthermore, a part of the configuration of the radio base station according to each of the above-described exemplary embodiments may be omitted.

Further, the " . . . part" in the above-described exemplary embodiments may be replaced with " . . . circuitry", " . . . device", " . . . unit", " . . . module", or the like.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The terminals that communicate with the base station in the present disclosure may include all kinds of apparatuses, devices, and systems having a communication function (collectively referred to as communication devices). The communication devices may include radio transceivers and processing and control circuits. The radio transceivers may include receivers and transmitters, or both of them as functions. The radio transceivers (transmitters and receivers) may include radio frequency (RF) modules and one or more antennas. The RF modules may include amplifiers, RF modulators and demodulators, or the like. Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A control device according to an exemplary embodiment of the present disclosure includes reception circuitry which, in operation, receives control information regarding resources to be allocated to a plurality of distributed units, and control circuitry which, in operation, determines, based on the control information, a distributed unit to which a received signal of uplink is to be transferred among the plurality of distributed units.

In an exemplary embodiment of the present disclosure, the control device is provided in a radio unit connected to the plurality of distributed units, and the radio unit includes radio reception circuitry which, in operation, receives the received signal via an antenna.

In an exemplary embodiment of the present disclosure, the control device is provided between the plurality of distributed units and a radio unit which, in operation, receives the received signal, and the control circuitry, in operation, receives the received signal from the radio unit.

In an exemplary embodiment of the present disclosure, the reception circuitry, in operation, receives the control information from at least one of the plurality of distributed units.

In an exemplary embodiment of the present disclosure, the control information indicates a frequency resource allocated to each of the plurality of distributed units, and the control circuitry, in operation, determines to transfer the received signal corresponding to the frequency resource to the distributed unit.

In an exemplary embodiment of the present disclosure, the control information indicates a time resource allocated to each of the plurality of distributed units, and the control circuitry, in operation, determines to transfer the received signal corresponding to the time resource to the distributed unit.

A control device according to an exemplary embodiment of the present disclosure includes a control circuitry which, in operation, determines control information regarding resources to be allocated to a plurality of distributed units, and a transmission circuitry which, in operation, transmits the control information to a device that determines a distributed unit to which a received signal of uplink is to be transferred among the plurality of distributed units.

In an exemplary embodiment of the present disclosure, the control device is provided in at least one of the plurality of distributed units.

A control method according to an exemplary embodiment of the present disclosure is performed by a control device. The control method includes receiving control information regarding resources to be allocated to a plurality of distributed units, and determining, based on the control information, a distributed unit to which a received signal of uplink is to be transferred among the plurality of distributed units.

A control method according to an exemplary embodiment of the present disclosure is performed by a control device. The control method includes determining control information regarding resources to be allocated to a plurality of distributed units, and transmitting the control information to a device that determines a distributed unit to which a received signal of uplink is to be transferred among the plurality of distributed units.

An exemplary embodiment of the present disclosure is useful for radio communication systems.

What is claimed is:

1. A control device comprising:
reception circuitry which, in operation, receives control information regarding resources to be allocated to a plurality of distributed units; and
control circuitry which, in operation, determines, based on the control information, a distributed unit to which a received signal of uplink is to be transferred among the plurality of distributed units, wherein
the control information indicates a frequency resource allocated to each of the plurality of distributed units, and
the control circuitry, in operation, determines to transfer the received signal corresponding to the frequency resource to the distributed unit.

2. The control device according to claim 1, wherein
the control device is provided in a radio unit connected to the plurality of distributed units, and
the radio unit includes radio reception circuitry which, in operation, receives the received signal via an antenna.

3. The control device according to claim 1, wherein
the control device is provided between the plurality of distributed units and a radio unit which, in operation, receives the received signal, and
the control circuitry, in operation, receives the received signal from the radio unit.

4. The control device according to claim 1, wherein the reception circuitry, in operation, receives the control information from at least one of the plurality of distributed units.

5. The control device according to claim 1, wherein
the control information indicates a time resource allocated to each of the plurality of distributed units, and
the control circuitry, in operation, determines to transfer the received signal corresponding to the time resource to the distributed unit.

6. A control device comprising:
control circuitry which, in operation, determines control information regarding resources to be allocated to a plurality of distributed units; and
transmission circuitry which, in operation, transmits the control information to a device that determines, based on the control information, a distributed unit to which a received signal of uplink is to be transferred among the plurality of distributed units, wherein
the control information indicates a frequency resource allocated to each of the plurality of distributed units, and
the device, in operation, determines to transfer the received signal corresponding to the frequency resource to the distributed unit.

7. The control device according to claim 6, wherein the control device is provided in at least one of the plurality of distributed units.

8. A control method performed by a control device, the control method comprising:
receiving control information regarding resources to be allocated to a plurality of distributed units; and
determining, based on the control information, a distributed unit to which a received signal of uplink is to be transferred among the plurality of distributed units, wherein
the control information indicates a frequency resource allocated to each of the plurality of distributed units, and
said determining includes determining to transfer the received signal corresponding to the frequency resource to the distributed unit.

9. A control method performed by a control device, the control method comprising:
determining control information regarding resources to be allocated to a plurality of distributed units; and
transmitting the control information to a device that determines, based on the control information, a distributed unit to which a received signal of uplink is to be transferred among the plurality of distributed units, wherein
the control information indicates a frequency resource allocated to each of the plurality of distributed units, and
the device, in operation, determines to transfer the received signal corresponding to the frequency resource to the distributed unit.

* * * * *